US012659597B2

(12) United States Patent
Yang

(10) Patent No.: US 12,659,597 B2
(45) Date of Patent: Jun. 16, 2026

(54) ELECTRONIC DEVICES AND CORRESPONDING METHODS FOR DYNAMICALLY AND AUTOMATICALLY SELECTING EXPOSURE VALUES FOR BRACKETING OPERATIONS GENERATING HIGH DYNAMIC RANGE (HDR) IMAGES

(71) Applicant: Motorola Mobility LLC, Chicago, IL (US)

(72) Inventor: Jie Yang, Schererville, IN (US)

(73) Assignee: Motorola Mobility LLC, Chicago, IL (US)

( * ) Notice: Subject to any disclaimer, the term of this patent is extended or adjusted under 35 U.S.C. 154(b) by 225 days.

(21) Appl. No.: 18/434,619

(22) Filed: Feb. 6, 2024

(65) Prior Publication Data

US 2025/0254433 A1      Aug. 7, 2025

(51) Int. Cl.
*H04N 23/741*      (2023.01)
*G06T 5/50*      (2006.01)
*H04N 23/72*      (2023.01)
*H04N 23/73*      (2023.01)
*H04N 23/743*      (2023.01)

(52) U.S. Cl.
CPC ............ *H04N 23/741* (2023.01); *G06T 5/50* (2013.01); *H04N 23/72* (2023.01); *H04N 23/73* (2023.01); *H04N 23/743* (2023.01); *G06T 2207/10144* (2013.01); *G06T 2207/20208* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 6,100,937 A | 8/2000 | DiMeo | |
| 9,955,085 B2 | 4/2018 | Sachs et al. | |
| 10,602,075 B2 * | 3/2020 | Case ...................... | H04N 5/265 |
| 2009/0251591 A1 | 10/2009 | Whitham | |
| 2011/0176024 A1 | 7/2011 | Kwon et al. | |
| 2011/0211732 A1 * | 9/2011 | Rapaport .............. | G06F 3/1454 |
| | | | 382/173 |

(Continued)

FOREIGN PATENT DOCUMENTS

WO      WO-2014138697 A1 *      9/2014      ............. H04N 25/70

OTHER PUBLICATIONS

"How to Read Your Camera's Histogram", The Creative Photographer; Tutorial; Unknown Pub Date but prior to filing of present app; Viewed online Nov. 29, 2023 at https://www.creative-photographer.com/read-camera-histogram/#:~...ogram%20tells%20you,you%20complete%20control%20over%20exposure.

(Continued)

*Primary Examiner* — James M Hannett
(74) *Attorney, Agent, or Firm* — Philip H. Burrus, IV

(57)      ABSTRACT

An electronic device includes an image sensor and one or more processors operable with the image sensor. The one or more processors are operable to dynamically and automatically select-exposure values using a camera response function for the image sensor for a sequence of images to generate an HDR image. The one or more processors can cause the image sensor to capture the sequence of images using the exposure values selected and can fuse the sequence of images to create the HDR image.

20 Claims, 16 Drawing Sheets

(56) References Cited

U.S. PATENT DOCUMENTS

| 2012/0002082 A1* | 1/2012 | Johnson | G06T 7/32 |
| | | | 348/E9.053 |
| 2014/0354842 A1 | 12/2014 | Pflughaupt et al. | |
| 2016/0125630 A1 | 5/2016 | Narahari et al. | |
| 2017/0154456 A1 | 6/2017 | Cao et al. | |
| 2024/0153055 A1* | 5/2024 | Bonnier | G06T 5/92 |

OTHER PUBLICATIONS

What are RGB and YUV color spaces?, Blog Published Apr. 5, 2022; dexonsystems.com; available at https://dexonsystems.com/blog/rgb-yuv-color-spaces#:~:text=There%20are%20a%20number%20of,and%20(V)%20red%20projection.

Bilcu, et al., "High Dynamic Range Imaging on Mobile Device", Nokia Research Center White Paper; 2008 IEEE Conference; Downloaded May 11, 2023.

Gallo, et al., "Metering for Exposure Stacks", Eurographics; White Paper; Published 2012; vol. 31, No. 2.

Gelfand, et al., "Multi-exposure Imaging on Mobile Devices", Presented Oct. 2010; Available online at http://graphics.stanford.edu/~shpark7/projects/hdr_gelfand_mm10.pdf; Viewed May 2023.

Huang, et al., "Intelligent Exposure Determination for High Quality HDR Image Generation", White Paper; IEEE 2013 Conference; Downloaded May 10, 2023.

Mansurov, Nasim , "What is ISO? The Complete Guide for Beginners", Photography Tutorial published Sep. 15, 2022 at https://photographylife.com/what-is-iso-in-photography.

Pourreza-Shahri, et al., "Exposure Bracketing Via Automatic Exposure Selection", White Paper; IEE Explore; Published in 2015; Downloaded May 10, 2023.

Van Beek, Peter , "Improved Image Selection for Stack-Based HDR Imaging", Cheriton School of Computer Science; University of Waterloo; White Paper published Jun. 19, 2018.

* cited by examiner

1400

DETECT USER INPUT AT USER INTERFACE INITITING IMAGE CAPTURE OP.
1301

OBTAIN EXPOSURE FROM METADATA
1302

1401
ISO AND EXPOSURE TIME CHANGE?

N
RETRIEVE PREVIOUS BRACKETING EXPOSURE VALUES FROM MEMORY
1402

Y
AUTOMATICALLY SELECT BRACKETED EXPOSURE VALUES FROM CALCULATION
1303

CAMERA RESPONSE F(X)

CAPTURE BRACKETING SEQUENCE OF IMAGES
1304

FUSE BRACKETED IMAGES TO GENERATE HDR IMAGE
1305

-- PRIOR ART --

1501

1601

-- PRIOR ART --

1701

1801

1

ELECTRONIC DEVICES AND CORRESPONDING METHODS FOR DYNAMICALLY AND AUTOMATICALLY SELECTING EXPOSURE VALUES FOR BRACKETING OPERATIONS GENERATING HIGH DYNAMIC RANGE (HDR) IMAGES

BACKGROUND

Technical Field

This disclosure relates generally to electronic devices, and more particularly to electronic devices having image sensors capable of capturing images.

Background Art

Modern electronic devices, examples of which include smartphones, tablet computers, and laptop computers, generally include at least one image capture device in the form of one or more cameras. These cameras can be used to capture images and video. To keep the overall size of these devices compact, the image capture devices are generally very small with short focal lengths and relatively small apertures. These features give rise to the ability of modern smartphones and other electronic devices to capture incredibly sharp, high-quality images.

While such image capture devices are good, due to their mechanical constructs they have a dynamic range (the range of lightest image elements to darkest image elements) of image reproduction that is limited when compared to the human eye. Due to these limitations, electronic device manufacturers frequently try to extend this limited dynamic range to create what are called "high dynamic range" or "HDR" images. While current HDR techniques are adequate, they employ static parameters that limit range expansion. It would be advantageous to have improved electronic devices and corresponding methods that resulted in HDR images having customized dynamic ranges.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

2 dynamic bracketing operation in accordance with one or more embodiments of the disclosure.

Figure 8:
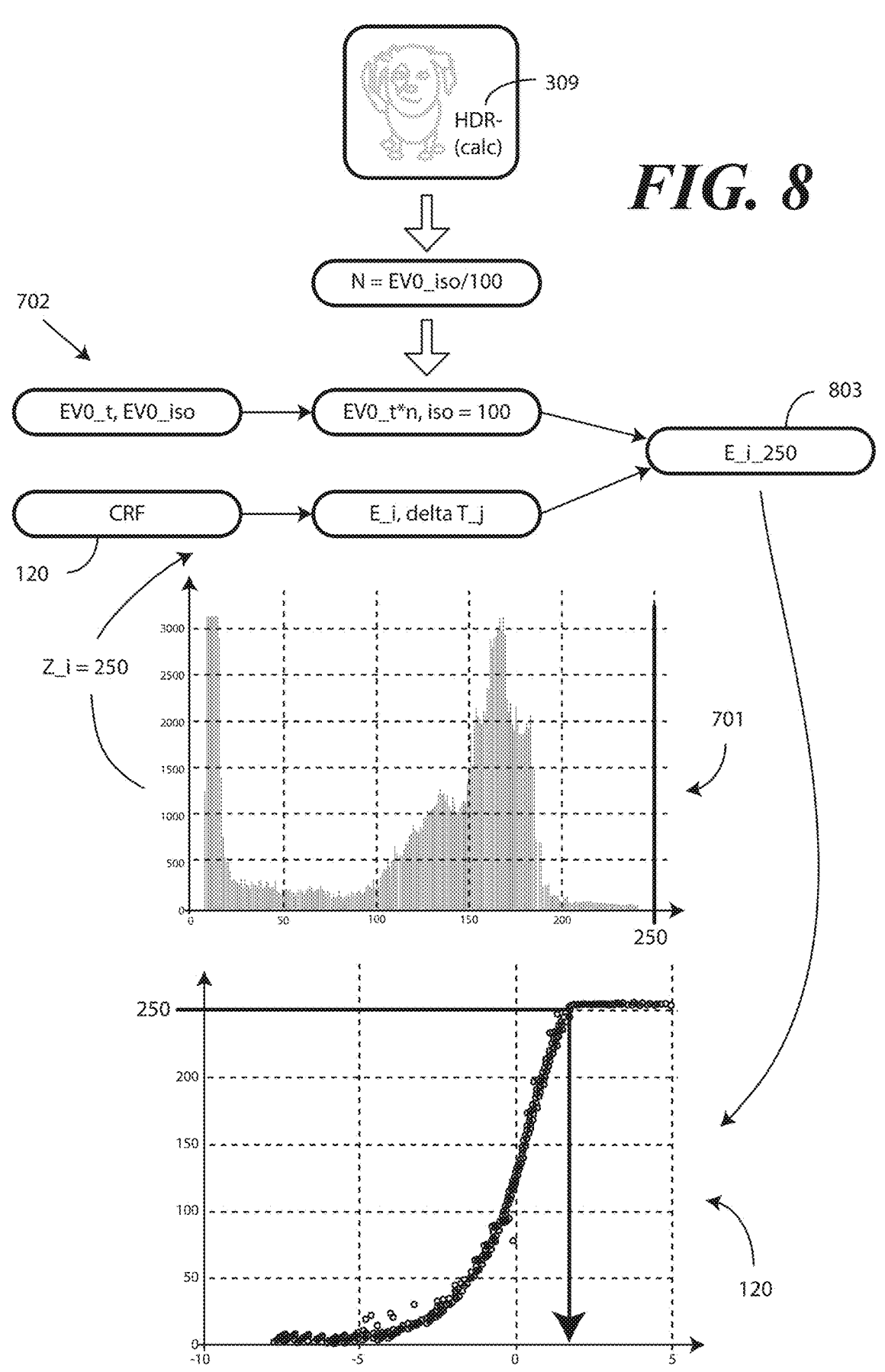

FIG. 8 illustrates one or more method steps for calculating a second exposure value suitable for use in an automatic and dynamic bracketing operation in accordance with one or more embodiments of the disclosure.

Figure 9:
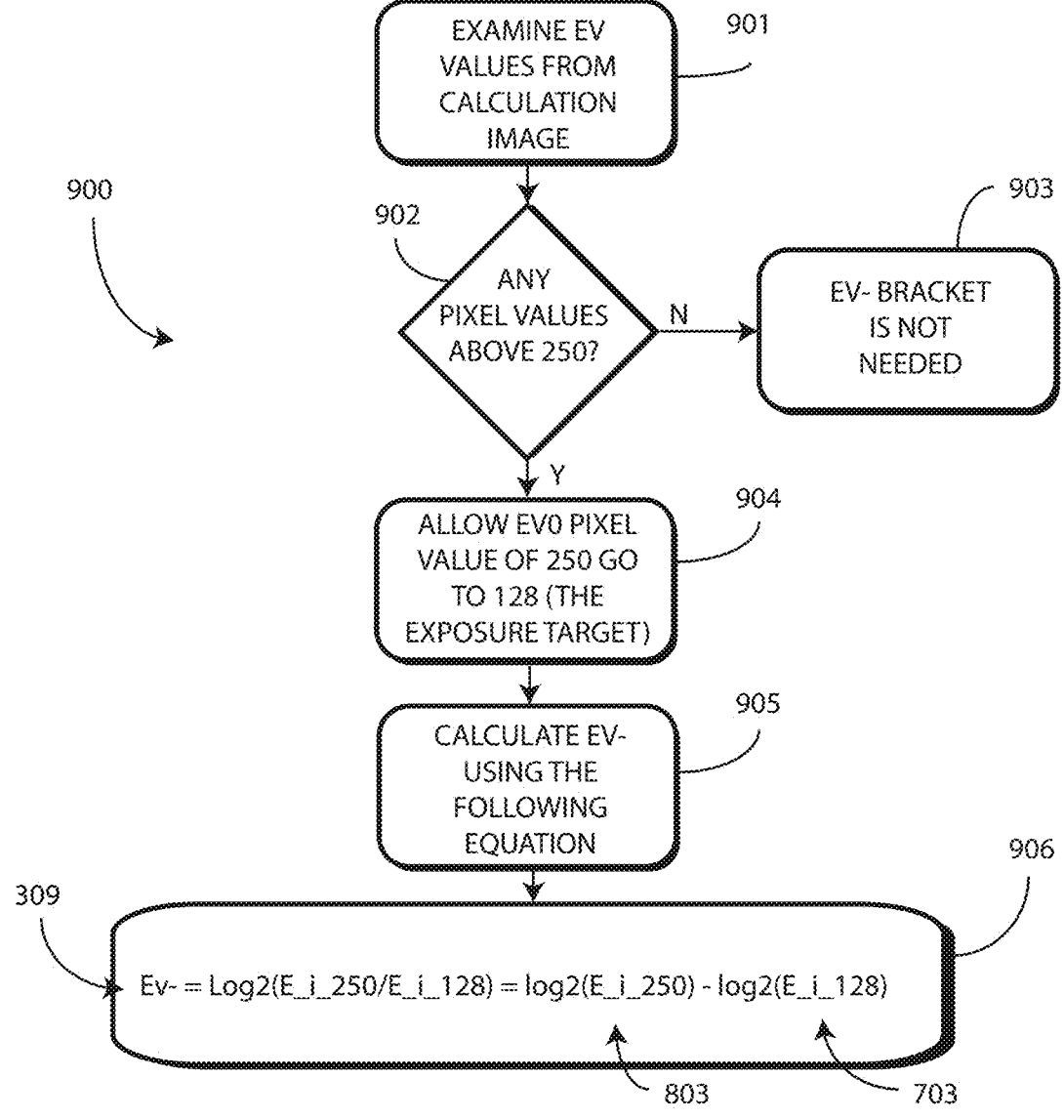

FIG. 9 illustrates one or more method steps in accordance with one or more embodiments of the disclosure.

Figure 10:
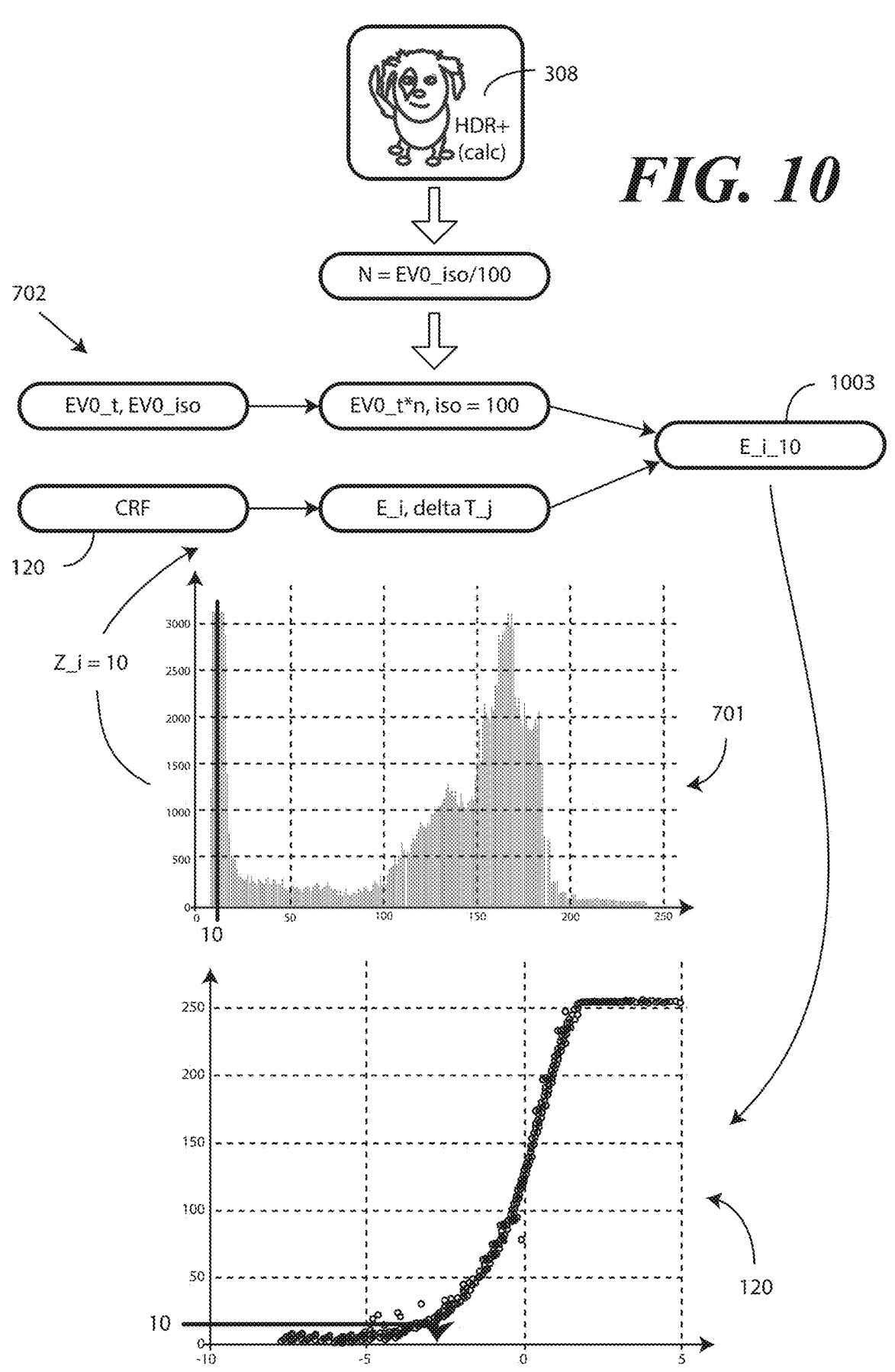

FIG. 10 illustrates one or more method steps for calculating a third exposure value suitable for use in an automatic and dynamic bracketing operation in accordance with one or more embodiments of the disclosure.

Figure 11:
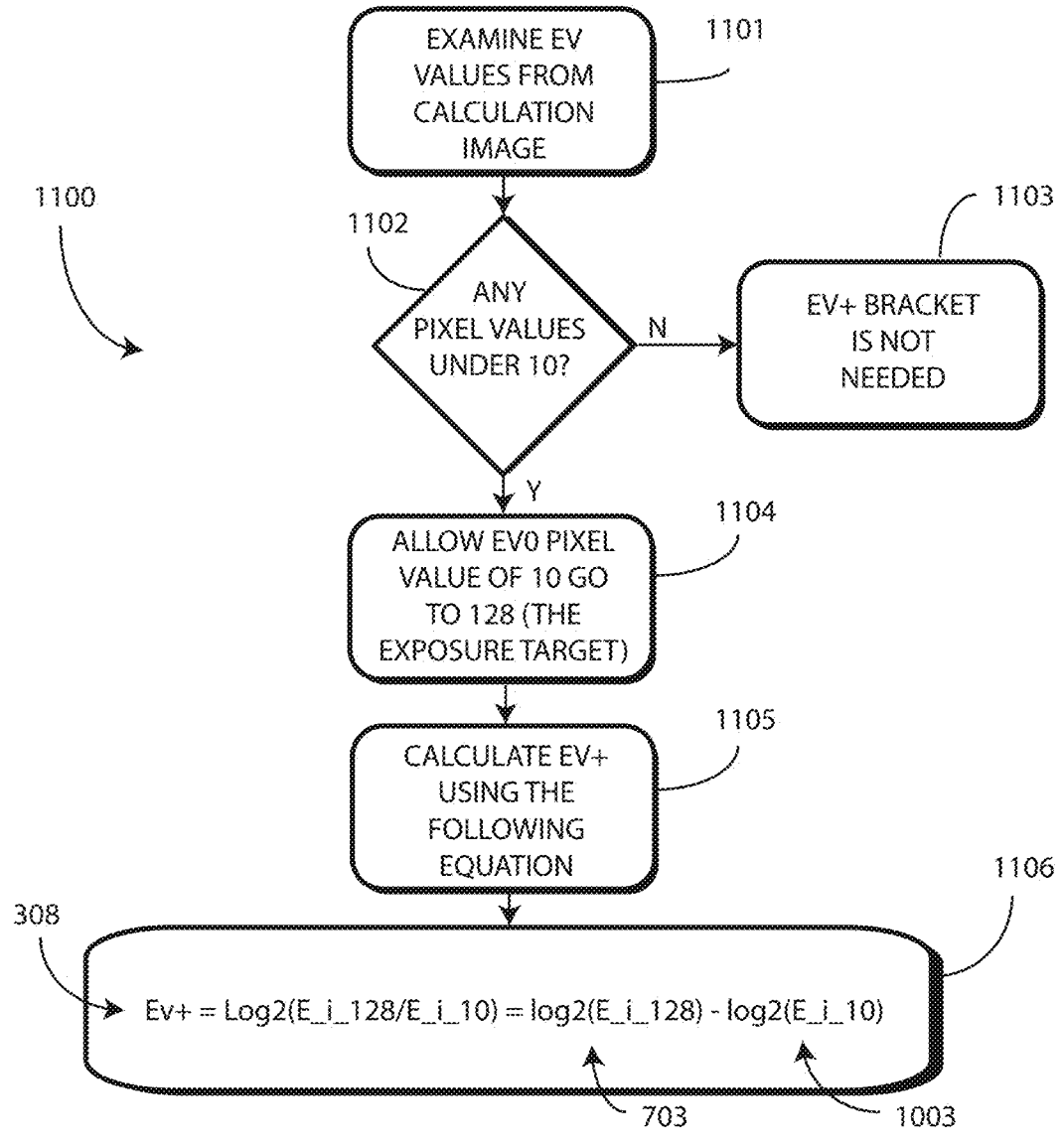

FIG. 11 illustrates one or more method steps in accordance with one or more embodiments of the disclosure.

Figure 12:
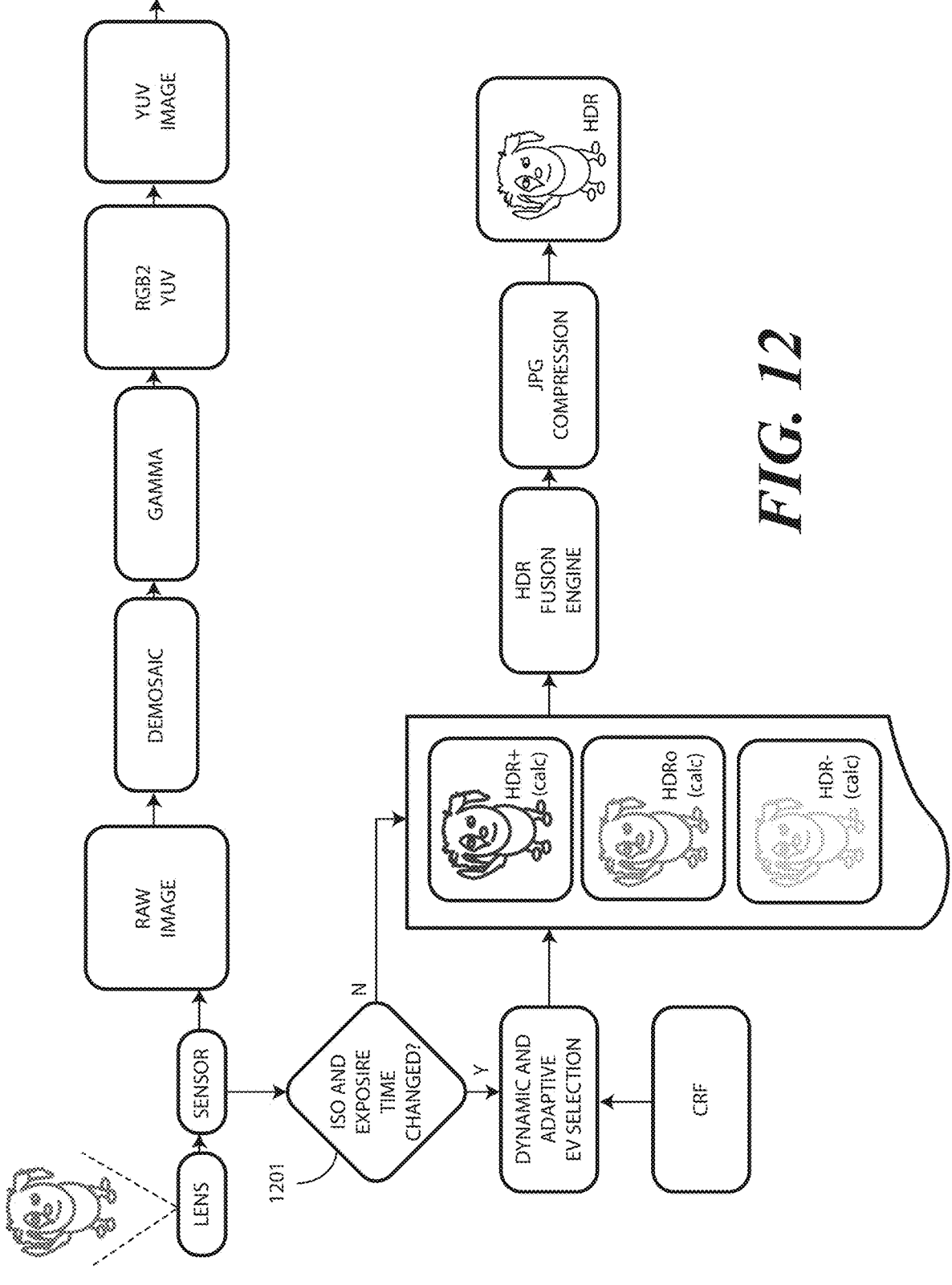

FIG. 12 illustrates another explanatory image processing signal flow in accordance with one or more embodiments of the disclosure.

Figure 13:
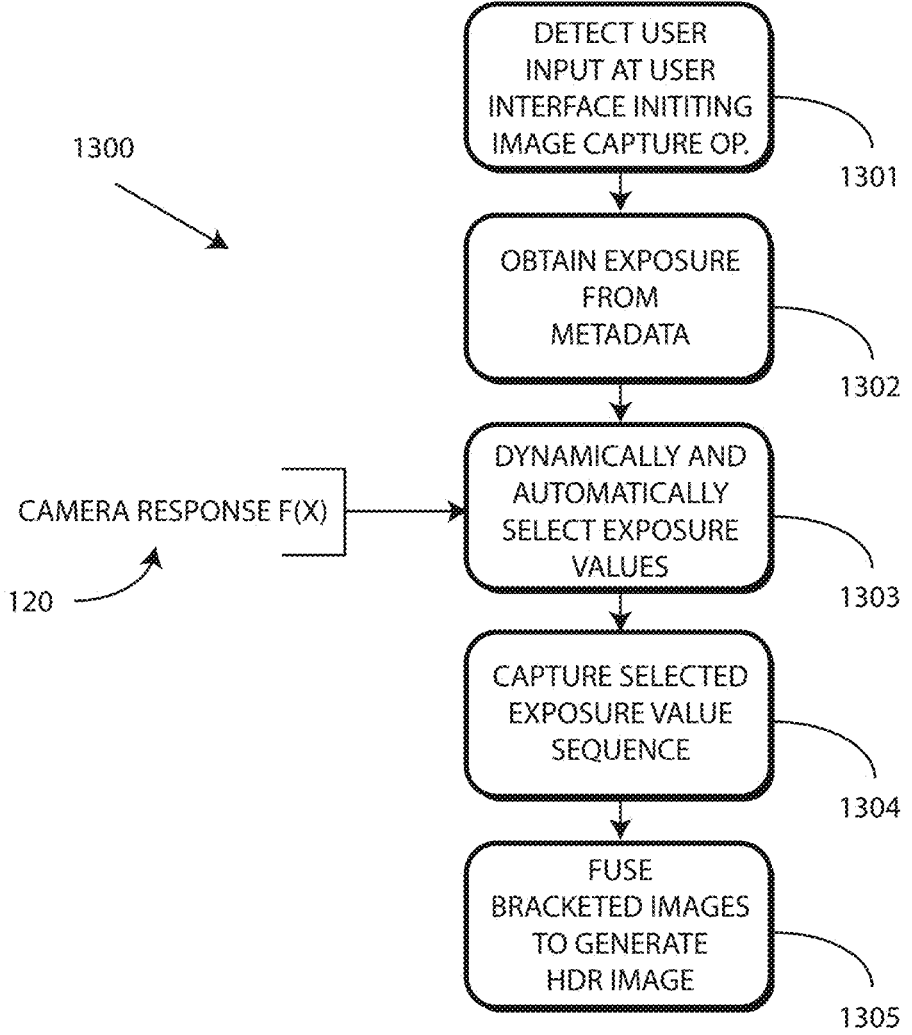

FIG. 13 illustrates one or more method steps in accordance with one or more embodiments of the disclosure.

Figure 14:
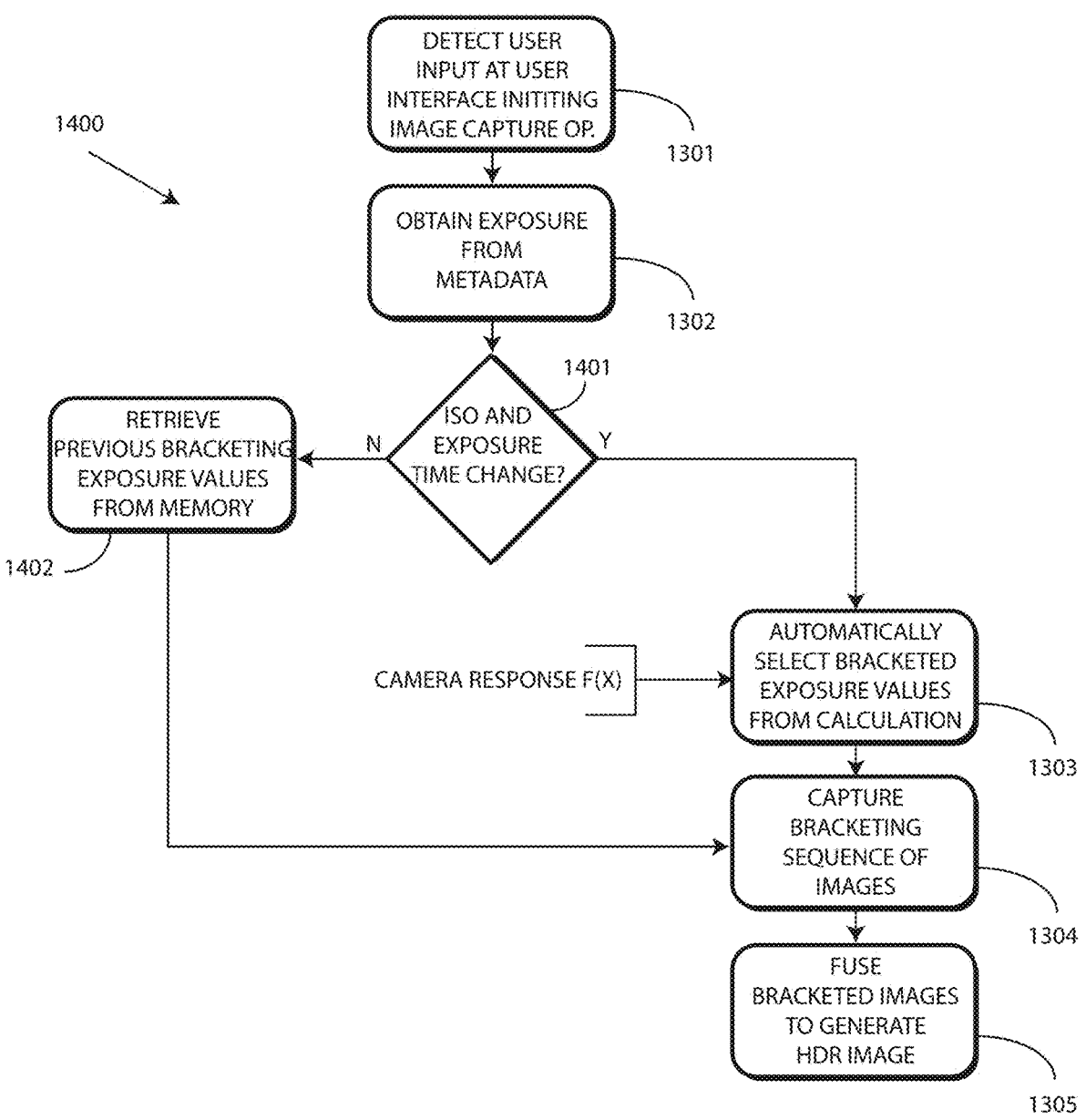

FIG. 14 illustrates one or more method steps in accordance with one or more embodiments of the disclosure.

Figure 15:
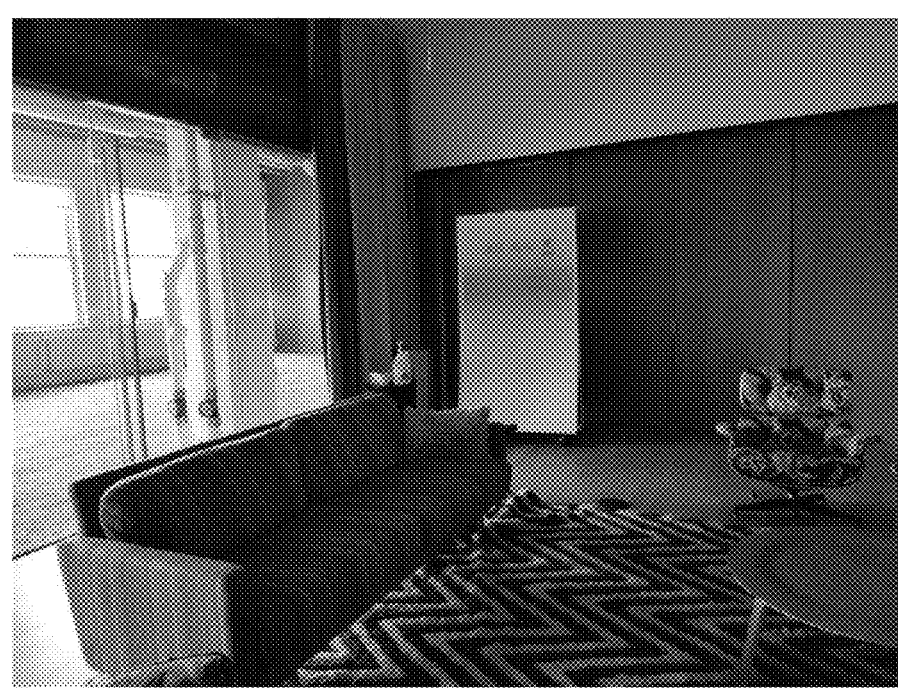

FIG. 15 illustrates an image captured using a prior art dynamic range extension technique.

Figure 16:
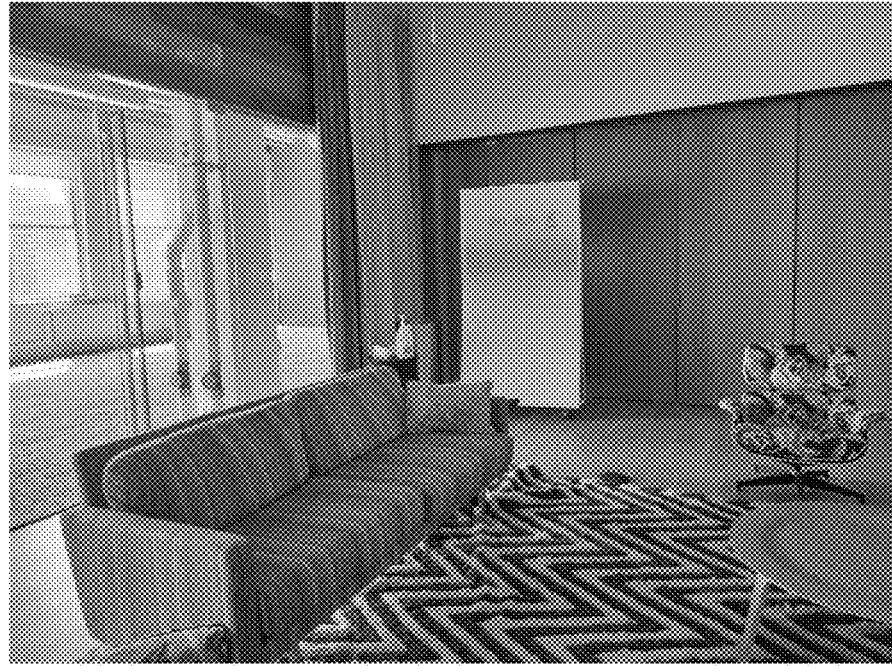

FIG. 16 illustrates an image captured using an electronic device configured in accordance with one or more embodiments of the disclosure.

Figure 17:

FIG. 17 illustrates another image captured using a prior art dynamic range extension technique.

Figure 18:

FIG. 18 illustrates another image captured using an electronic device configured in accordance with one or more embodiments of the disclosure.

Figure 19:
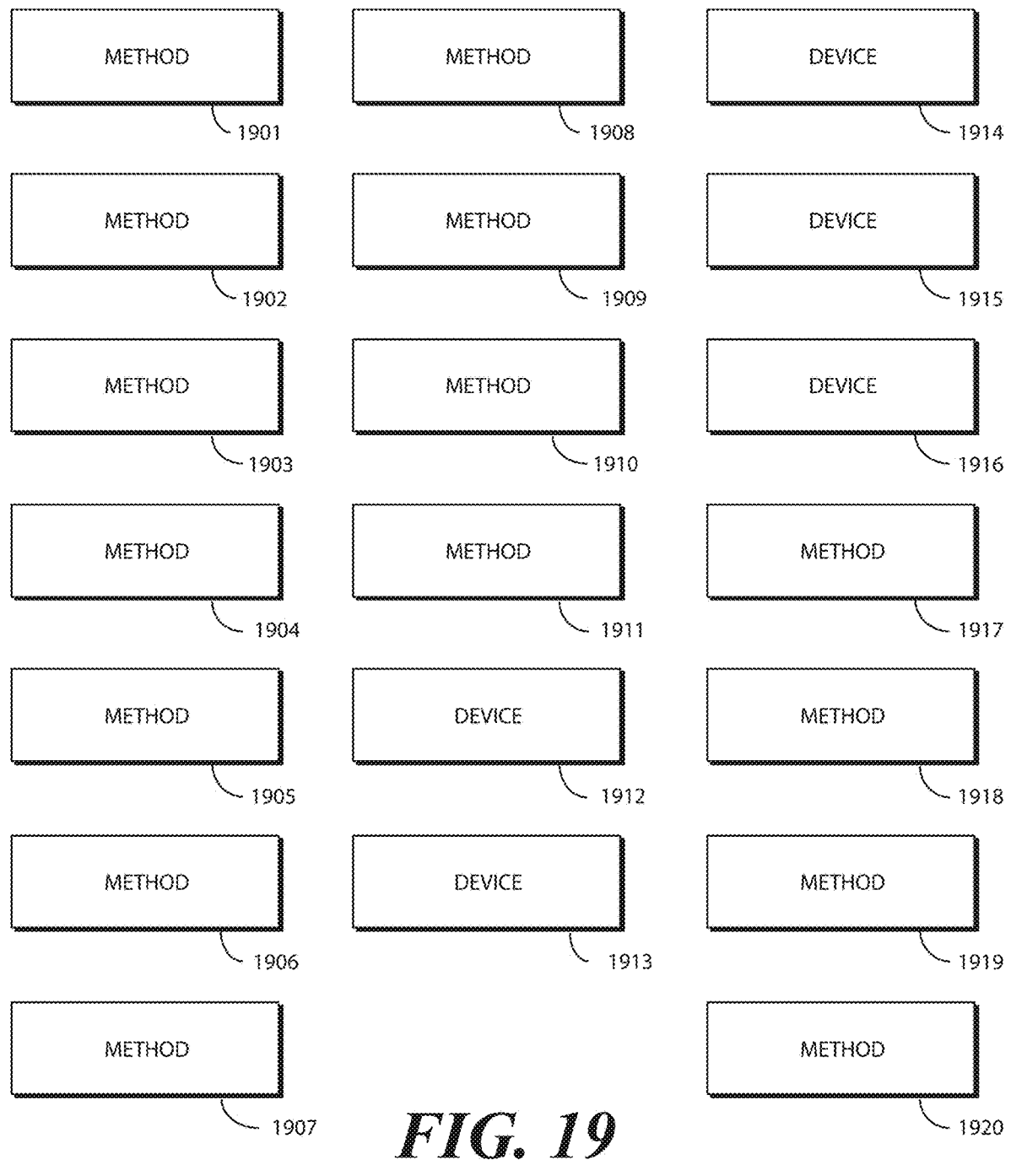

FIG. 19 illustrates one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to dynamically and automatically, using one or more processors of an electronic device, selecting exposure values for a sequence of images to be used in a bracketing operation generating an HDR image, capturing the sequence of images using an image sensor and the exposure values selected, and fusing the sequence of images using the one or more processors to generate the HDR image. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of dynamically and automatically selecting, by one or more processors in response to the initiation of an image capture operation, exposure values using a camera response function for an image sensor of the electronic device for a sequence of images to be used in a bracketing operation generating an HDR image, causing the image sensor to capture the sequence of images using the exposure values selected, and fusing the sequence of images to create an HDR image as described herein. The non-processor circuits may include, but are not limited to, a radio receiver, a radio transmitter, signal drivers, clock circuits, power source circuits, and user input devices.

As such, these functions may be interpreted as steps of a method to perform dynamically and automatically selecting exposure values for a sequence of images to be used in a bracketing operation generating an HDR image in response to initiation of an image capture operation by subtracting one or more base two logarithmic luma values of a camera response function when pixels of the sample image have either luma values above a saturation level of the camera response function or a below.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent.

The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

As noted above, embodiments of the disclosure contemplate that image sensors included with portable electronic devices, examples of which include smartphones, tablet computers, and wearable devices, have a limited dynamic range when compared to the human eye. While people are able to discern the equivalent of sixteen "stops" of a camera aperture, which corresponds to one hundred decibels, a typical image capture device may only be able to discern eight stops, which corresponds to about forty-eight decibels. As can be seen, the dynamic range of an ordinary sensor used in an image capture device is half that of the human eye.

Embodiments of the disclosure also contemplate that dynamic range reproduction is one of the most important attributes of generating high quality images. Accordingly, manufacturers continually attempt to extend dynamic range to create high dynamic range images. The preference for HDR images extends beyond consumer portable electronic devices into other industries, examples of which include medical image capture devices, security image capture devices. Everyone seems to want better images with higher dynamic range.

Prior art devices have attempted to extend the dynamic range in many different ways. Illustrating by example, in one method a raw image from the image sensor is converted into a "YUV" image represented by a luma component (Y) and two chroma components (U and V). A bracketing operation is then performed to create a nominally exposed image, a positively exposed image, and a negatively exposed image. A fusion engine then fuses the bracketed images to generate a HDR image. In another method, the bracketing operation is performed on a raw image rather than a YUV image. The bracketed images are then fused to generate the HDR image. In a third method, an image sensor captures multiple raw images in a burst mode. After filtering, denoising, and performing white balance operations, the fusion engine fuses the burst raw images to generate the HDR image.

In a fourth method, known as "staggered HDR," the image capture device will use a long, medium, and short exposure schedule for different pixels of the image sensor's pixel array. The fusion results from the three or two single exposure images from one exposure frame time. The difference between this method and the first two methods described in the preceding paragraph is that those methods bracket exposure value from different frames while this fourth method uses exposure decisions made from streaming the same sensor frame. This makes the fourth method quicker while avoiding ghosting and some registration problems. The third method described above intentionally uses less exposure time, but still uses different frames from sensor. This results in the third method having more motion problems than the fourth method (by design).

A fifth method of generating HDR images is known as "four cell spatial fusion." In this method, one pixel is divided into four pixel subcomponents, with one pixel subcomponent being exposed for a long time, two other pixel subcomponents being exposed for a medium exposure time, and the fourth pixel subcomponent being exposed with a shorter exposure time. The fusion image then fuses these three low-resolution images.

In a sixth method, known as "dual conversion gain" or "DCG," a pixel scheme change is also used. In the sensor itself, a DCG transistor is added between the power supply and the reset gate. The additional transistor adjusts the "floating diffusion" capacitance by changing the operating time of the transfer transistor. This method requires large pixel or four-cell pixels. It also suffers from a DCG capacitor exit limit as well.

While the paragraphs above outline six different methods of extending dynamic range, with the first three methods being performed in software, the next two manipulating changes in the sensor register, and the last one causing a change in the pixel schemes, all six of these methods suffer from deficiencies. Indeed, the primary problem with all six of these methods is that the different exposure values used to generate the batch of images to be fused are all selected from pre-defined, pre-stored, and pre-selected "look-up table" or "LUT" files. LUT files provide only static exposure instructions that can be used in bracketing operation according to a predefined and preselected set of rules.

The problem with using static, pre-selected LUT files is that they are pre-selected in a lab or manufacturing facility and are not determined from the facts and environment around the electronic device when an image is being captured. Moreover, it can result in sub-optimal exposure time settings, analog gain settings, and digital gain settings resulting in a less than desirable metering of the image frame.

Advantageously, embodiments of the disclosure provide a solution to this dilemma by dynamically and automatically selecting exposure values for a sequence of images to be used in a bracketing operation generating an HDR image. Once these exposure values are dynamically and automatically selected, an image sensor can capture the sequence of images using the exposure values selected. One or more processors can then fuse the sequence of images to generate the HDR image. Advantageously, this dynamic and automatic selection allows for optimizing the exposure values used for bracketing based upon the real-time, constantly changing scenes and scene dynamic range. This allows for the automatic and dynamic creation of HDR images having the optimal exposure time, analog gain, and digital gain applied to data from the image sensor before HDR fusion. Simply put, this results in a pleasing HDR image.

In one or more embodiments, a method in an electronic device processes images in the YUV domain using dynamic and automatic selection of exposure values to fuse an HDR image. As will be shown below by comparing images captured using embodiments of the disclosure and prior art images, embodiments of the disclosure provide improved image quality compared to local tone mapping and global tone mapping used later in the image processing pipeline, as this later tone mapping increases overall image noise.

In one or more embodiments, an electronic device comprises an image sensor and one or more processors operable with the image sensor. In one or more embodiments, the one or more processors are operable to dynamically and automatically select, in response to initiation of an image capture operation, exposure values using a camera response function for the image sensor for a sequence of images to be used in a bracketing operation generating an HDR image. In one or more embodiments, these exposure values are calculated in real time and are not retrieved from any LUT file. The one or more processors can then cause the image sensor to capture the sequence of images using the exposure values selected and then fuse the sequence of images to create the HDR image.

In one or more embodiments, this dynamically and automatically selecting the exposure values in real time, while omitting the need for any LUT file, also employs a pre-calibration step to obtain the camera response function. Advantageously, this results in the processing time for capturing the sequence of images used in the bracketing operation being very fast.

In one or more embodiments, to further speed up the selection process for the exposure values, for frames other than the first frame, i.e., the "warm up" frame, the differences in exposure time and ISO can be obtained for the sensor. When these values are sufficiently stable, in one or more embodiments the one or more processors omit recalculating the exposure values from the previous image capture operation.

It should be noted that while an illustrative embodiment described below operates in the YUV domain, the dynamically and automatically selection of the exposure values for the bracketing operation can also be used in the raw domain as well. Thus, while a YUV domain is used as an illustrative example, those of ordinary skill in the art having the benefit of this disclosure will readily understand the application of the same techniques in the raw domain.

What's more, while the six prior art methods described above all use static LUT files for bracketing operations, it should be noted that the dynamically and automatically selection of the exposure values for a bracketing operation in accordance with embodiments of the disclosure could also be used in the fourth, fifth, and sixth prior art methods in place of the use of LUTs as will be obvious to those of ordinary skill in the art having the benefit of this disclosure. Other advantages offered by embodiments of the disclosure will be described below. Still others will be obvious to those of ordinary skill in the art having the benefit of this disclosure.

Figure 1:
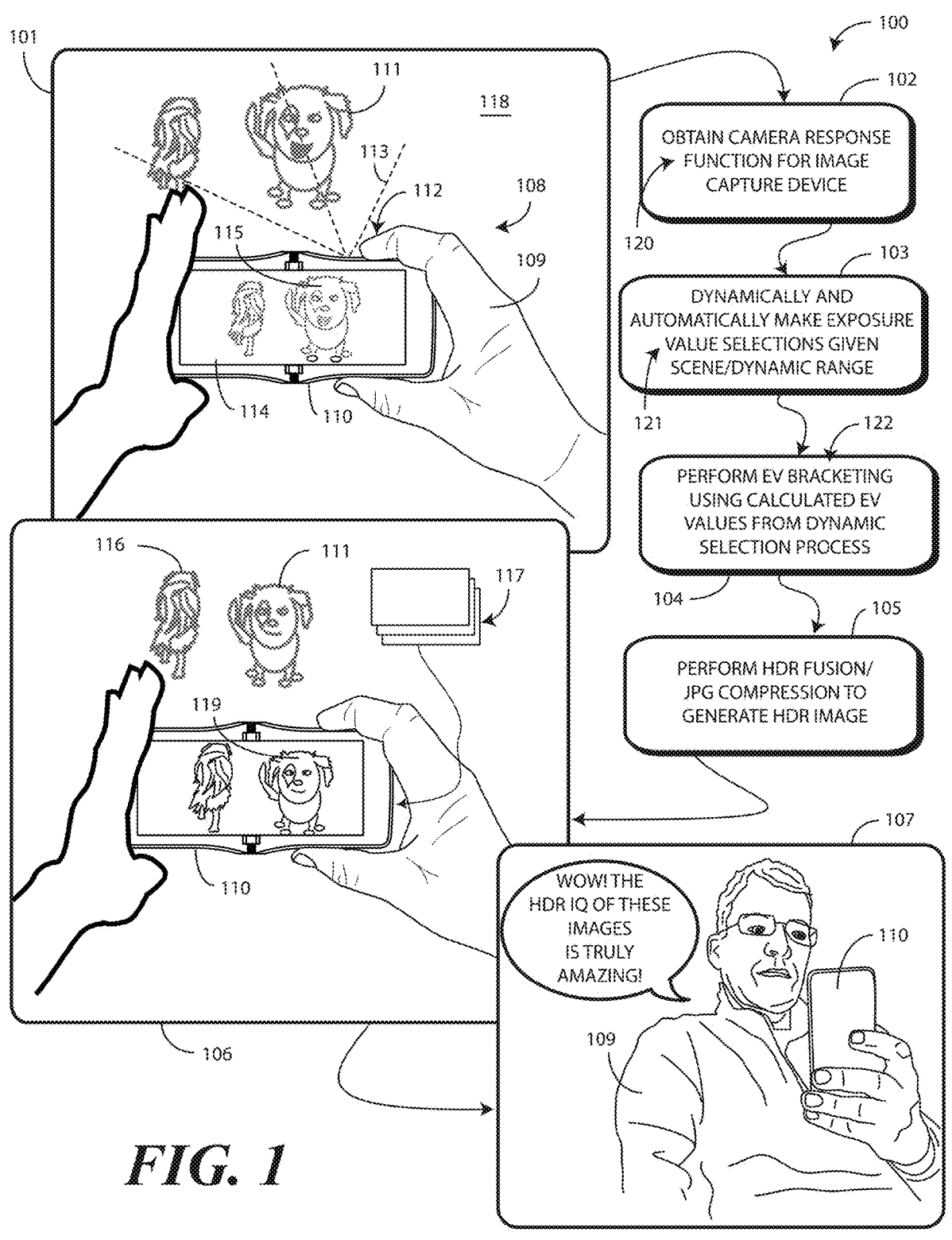
FIG. 1 illustrates one explanatory method in accordance with one or more embodiments of the disclosure.

Turning now to FIG. 1, illustrated therein is one explanatory method 100 and system 108 in accordance with one or more embodiments of the disclosure. Beginning at step 101, a user 109 is directing an image capture device (located on the rear side) of an electronic device 110 toward a subject 111. The user 109 is also delivering user input 112 initiating an image capture operation 113 that will ultimately cause the image capture device to capture one or more images of the subject 111, one example of which is the HDR image 119 shown at step 106.

In this illustrative embodiment, the user input 112 comprises the user 109 touching a physical button situated on the electronic device 110. In other embodiments, the user input 112 might comprise the user delivering touch input to a user actuation target or other icon presented on the display 114 of the electronic device 110. Other options for delivering user input 112 to the electronic device 110 to initiate the image capture operation 113 will be obvious to those of ordinary skill in the art having the benefit of this disclosure.

In one or more embodiments, the user input 112 initiating the image capture operation 113 may launch a camera application operating on one or more processors of the electronic device 110. When this occurs, the image capture device can use its image sensor to stream one or more preview images 115 in the form of image sensor data for presentation on the display 114 of the electronic device 110.

At step 102, one or more processors of the electronic device 110 obtain a camera response function 120 of the image sensor of the image capture device. In one or more embodiments, this camera response function 120 is stored in the memory of the electronic device 110. One example of such a camera response function 120 is shown in FIG. 5.

Figures 5, 6:
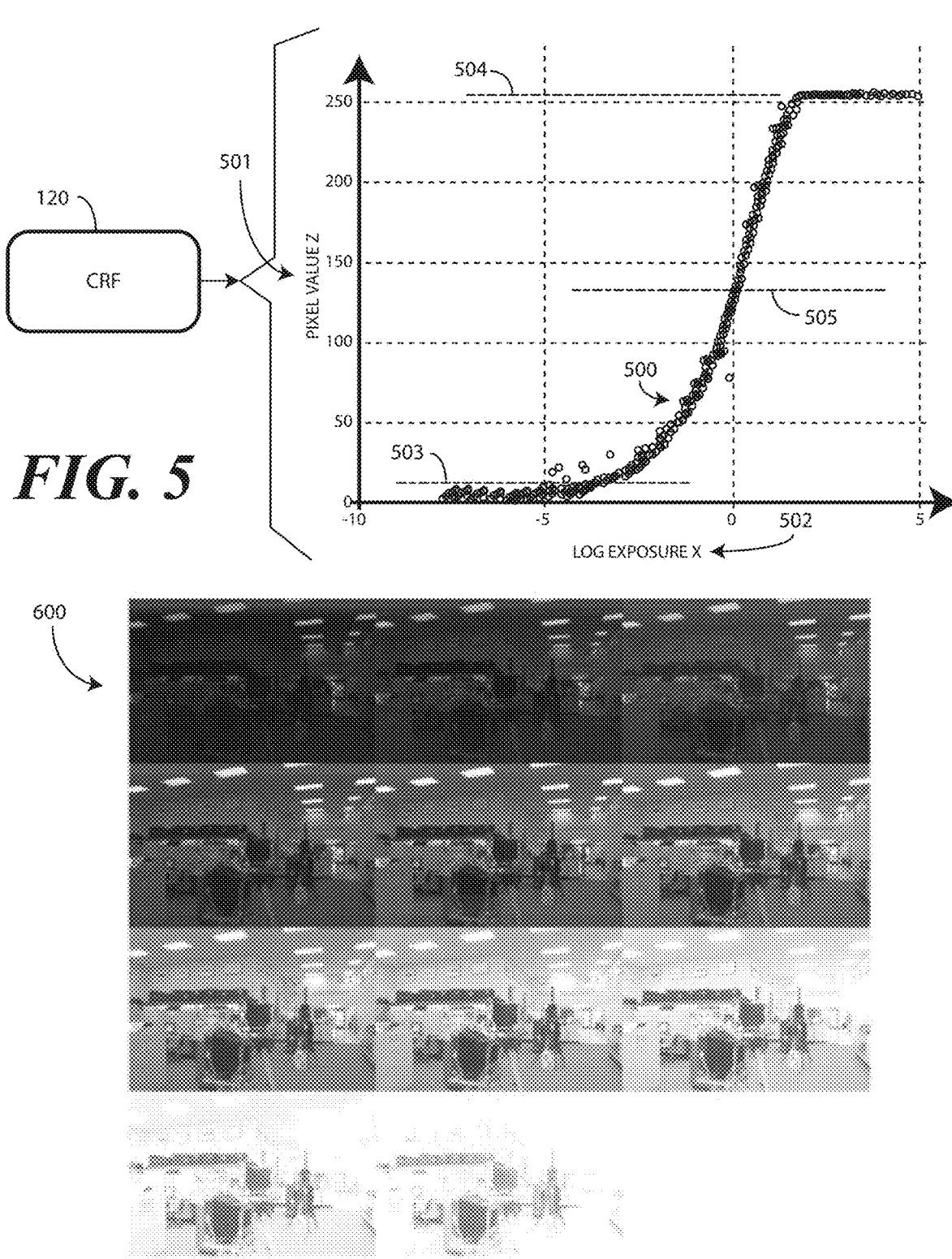
FIG. 5 illustrates one explanatory camera response function in accordance with one or more embodiments of the disclosure.
FIG. 6 illustrates sample images captured with an image capture device at shutter speeds progressing in one-stop increments from one thirtieth of a second to thirty seconds.

Turning briefly to FIG. 5, it can be seen that the camera response function 120 is a plot 500 of pixel value readings 501 from pixels of the image sensor versus exposure time. In this illustrative embodiment, the exposure time is presented in a logarithmic scale as the logarithm of exposure time 502.

It should be noted that the pixel value readings 501 of this illustrative embodiment are eight-bit values, and thus run from zero to 255. However, in other embodiments other sensors will provide pixel value readings 501 in other formats. Illustrating by example, if the pixel value readings 501 are ten-bit values, they may extend from zero to 1023. In a fourteen-bit system, the pixel value readings 501 may extend from zero to 16,383. Other examples of image sensor resolutions and corresponding pixel value readings 501 will be obvious to those of ordinary skill in the art having the benefit of this disclosure.

As can be seen in FIG. 5, when the camera response function 120 is presented as a plot of pixel value readings 501 is plotted against the logarithm of exposure time 502, the camera response function 120 becomes a concave up exponential plot that runs between a black level limit luma value 503 where luma values are essentially unchanging as a function of the logarithm of exposure time 502 due to the darkness of the environment and a saturation limit luma value 504 where the same phenomena occurs, except due to brightness of the environment. As used herein, the black level limit luma value 503 is sometimes referred to with the abbreviation "BlkLL," while the saturation value is referred to with the abbreviation "SatVal."

Another characteristic of the camera response function 120 is that it has a mid-luma value 505 where the logarithm of exposure time used to generate the mid-luma value 505 is zero. This mid-luma value 505 is sometimes referred to herein with the abbreviation "MidVal."

The camera response function 120 can be generated in many different ways. In one or more embodiments, the camera response function 120 is generated by capturing a plurality of images with different shutter speeds, which provide the different exposure times set forth in the camera response function 120.

Illustrating by example, turning briefly to FIG. 6, illustrated therein is a set of images 600 of an indoor scene captured with shutter speeds progressing in one-stop increments from $\frac{1}{30}^{th}$ of a second to thirty seconds. Testing has confirmed that this will enable the camera response function (120) to move from the black level limit luma value (503) through the mid-luma value (505) to the saturation limit luma value (504). Once the camera response function (120) for the image sensor is determined, the camera response function (120) can be stored in a memory of an electronic device for use in accordance with embodiments of the disclosure.

It will be understood by those of ordinary skill in the art having the benefit of this disclosure that each image sensor will have its own camera response function (120), and different image sensors made by different manufacturers will frequently have different camera response functions and will seldom have identical camera response functions. Indeed, even different lots of the same image sensor from the same manufacturer can have different camera response functions, as will be obvious to those of ordinary skill in the art having the benefit of this disclosure.

Turning now back to FIG. 1, at step 102 the camera response function 120 for the image sensor of this electronic device 110 is obtained from memory. As will be described in more detail below, for example with reference to FIG. 4, in one or more embodiments the one or more processors of the electronic device 110 are configured to determine, in real time based upon conditions within an environment 118 of the electronic device 110 rather than from a static LUT file, one or more exposure values 121 to be used in a bracketing operation 122 generating an HDR image 119 in response to the initiation of the image capture operation 113. As will also be described below with reference to FIGS. 9 and 11, in one or more embodiments the one or more exposure values 121 are determined by subtracting one or more base two logarithm luma values of the camera response function 120.

In one or more embodiments, step 103 comprises dynamically and automatically selecting, using one or more processors of the electronic device 110, exposure values 121 for a sequence of images 117 to be used in the bracketing operation 122 generating the HDR image 119. In one or more embodiments, where step 101 comprises the one or more processors detecting, from a user interface of the electronic device 110, the user input 112 initiating the image capture operation 113 using the image sensor, the dynamic and automatic selection of the exposure values 121 at step 103 occurs in response to this user input 112 initiating the image capture operation 113. As noted above, in one or more embodiments the selection of the exposure values 121 for the sequence of images 117 at step 103 is made using a camera response function 120 of the image sensor of the image capture device of the electronic device 110.

Step 104 then comprises capturing, by the image sensor of the image capture device of the electronic device 110, the sequence of images 117 using the exposure values selected. In one or more embodiments, the exposure values 121 dynamically and automatically selected at step 103 include a normal exposure value, a positive exposure value, and a negative exposure value.

Thus, in one or more embodiments a first image of the sequence of images 117 has a normal exposure value. A second image of the sequence of images 117 has a positive exposure value, while a third image of the sequence of images 117 has a negative exposure value. As those of ordinary skill in the art will having the benefit of this disclosure will appreciate, the "exposure value" represents a combination of shutter speed and aperture into a single value where:

$$EV = \log_2(N^2/t) \tag{EQ. 1}$$

where N represents the stop number of the aperture and t represents the shutter speed.

In one or more embodiments, the normal value for the first image of the sequence of images 117 is set to zero. The exposure value for the second image of the sequence of images 117 has a positive value, and the exposure value for the third image of the sequence of images 117 has a negative value. Those of ordinary skill in the art having the benefit of this disclosure will appreciate, different image capture devices will have different ranges of exposure values. However, in many cases the possible exposure values will run from something like minus six to plus seventeen. Other ranges of exposure values will be obvious to those of ordinary skill in the art having the benefit of this disclosure.

It should also be noted that while three images are being described illustratively in this embodiment as being included with the sequence of images 117, in other embodiments more than three images or fewer than three images may be included in the sequence of images 117. Illustrating by example, in one or more embodiments an image having a negative exposure value will be included in the sequence of images 117 only when the preview image 115 has one or more pixels with a luma value above the saturation luma limit value (504) of the camera response function 120. If it does not, the sequence of images 117 may only include a first image having a normal exposure value of zero and another image having a positive exposure value.

Similarly, in one or more embodiments the sequence of images 117 will only include an image with a positive exposure value when the preview image 115 has one or more other pixels with a luma value less than the black level limit luma value (503) of the camera response function 120. If it does not, the sequence of images 117 may only include a first image having a normal exposure value of zero and other image having a negative exposure value.

If there are neither pixels above the saturation limit luma value (504) of the camera response function 120 or the black level limit luma value (503) of the camera response function 120, in one or more embodiments the bracketing operation 122 can be omitted. This ability to determine whether to perform the bracketing operation 122 and how many images should be included in the sequence of images 117, combined with the ability to dynamically and automatically select the exposure values 121 as a function of the environment 118 represented in the preview images 115, allows the electronic device 110 to be very fast in that the bracketing operation 122 is only performed when necessary.

Indeed, to make things even faster, in one or more embodiments the one or more processors of the electronic device 110 buffer, in a memory, a previous image. The previous image can be the initial preview image 115, the HDR image 119, an image of the sequence of images 117 having an exposure value of zero, or another image. When another image capture operation is initiated, the image sensor of the image capture device can capture another preview image.

The one or more processors can then determine whether an ISO and exposure time have changed between the previous image and the new preview images. When the ISO and exposure time have changed, the method 100 can repeat with the one or more processors dynamically and automatically selecting new exposure values at step 103 for another sequence of images to be used in another bracketing operation generating another HDR image. The image sensor can then capture the other sequence of images while the one or more processors can fuse the other sequence of images into the other HDR image.

However, where the ISO and exposure time have failed to change between the previous image and the new preview image, this process of selecting new exposure values can be omitted. Instead, the one or more processors can capture the new sequence of images using the previously selected exposure values and fuse the new sequence of images into another HDR image. Accordingly, in one or more embodiments the one or more processors are only configured to dynamically and automatically select the exposure values when both an ISCO and exposure time have changed between a preview image captured by the image sensor and a previous sample image by at least a predefined threshold.

Returning to the discussion of the sequence of images 117, generally speaking, in one or more embodiments a first image of the sequence of images 117 will have a normal exposure value set to zero and at least one other image will have another exposure value that is different from the normal exposure value. Where at least one pixel value of the preview image 115 has a luma value above the saturation limit luma value 504 and at least one pixel value of the preview image 115 has a luma value below the black level limit luma value 503, the sequence of images 117 will include at least three images.

So that the bracketing operation 122 can be properly performed, this illustrative sequence results in one image of the sequence of images 117 being nominally exposed, another being underexposed, and a third being overexposed. As information can be gleaned from each of these images, e.g., details of darker objects from the overexposed image and details of lighter objects in the under exposed image, the sequence of images 117 allows for the creation of a resulting image having a high dynamic range and detail at many different brightness levels.

Step 105 then comprises fusing, by the one or more processors of the electronic device 110, the sequence of images 117 to generate the HDR image 119 of the subject 111 and objects 116 in the background, which is shown being presented on the electronic device 110 at step 106. In this illustrative embodiment, the sequence of images 117 that are fused at step 105 to form the HDR image 119 at step 105 are each YUV images, with the fusion occurring in the YUV domain. However, as noted above, in other embodiments the sequence of images 117 can be raw images, with the fusion of step 105 occurring in the raw domain.

Since the dynamic range has been extended using the bracketing operation 122 from the exposure values 121 that were dynamically and automatically selected at step 103, the HDR image 119 has enhanced clarity, rendering even the object 116 in the background in high detail with the resulting image being sharp and clear. As shown at step 107, the user 109 is awed and amazed, having never seen such an amazing HDR image 119 in the given environment 118 made by a compact electronic device 110 before.

Figure 2:
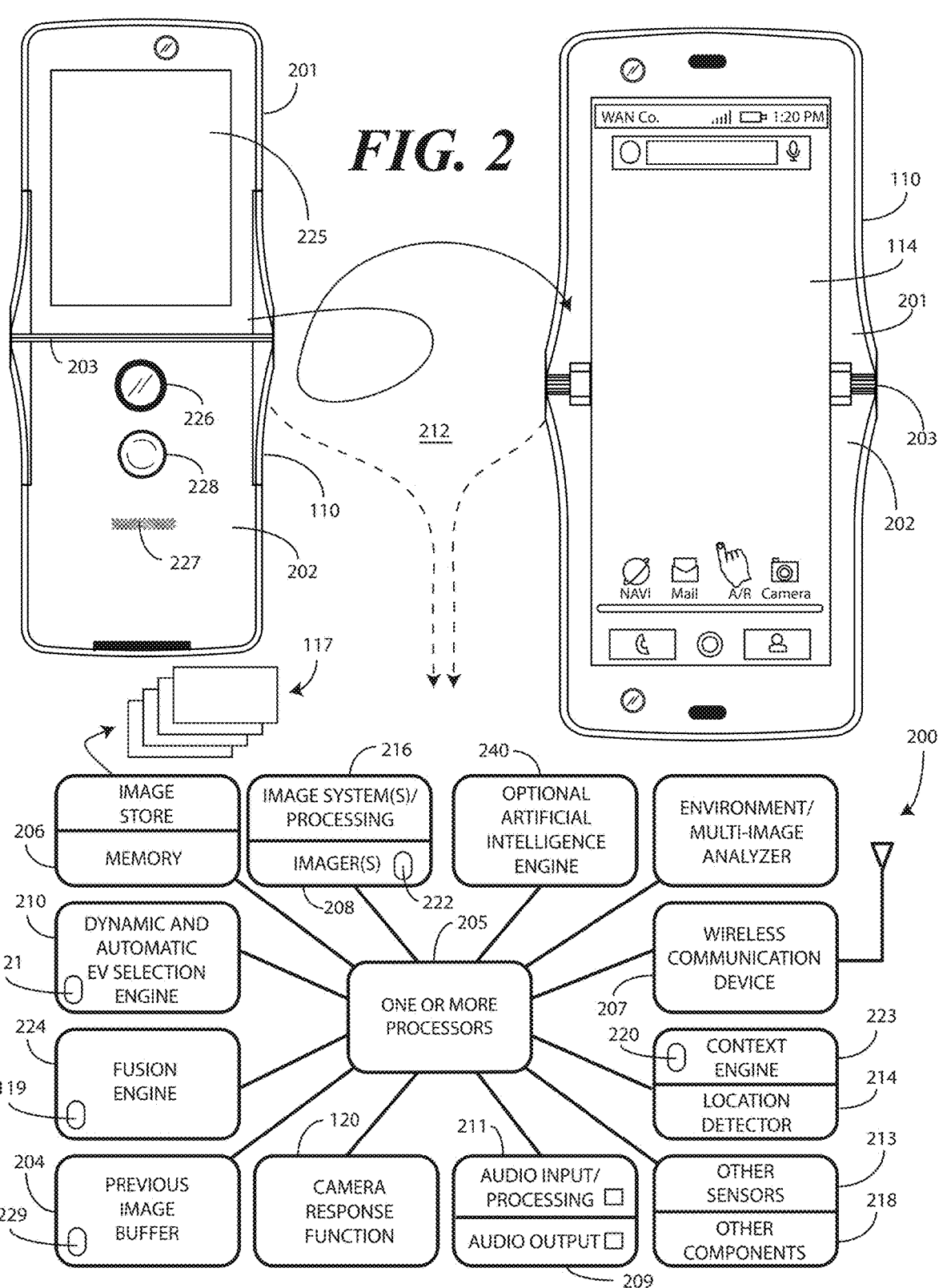
FIG. 2 illustrates one explanatory electronic device in accordance with one or more embodiments of the disclosure.

Turning now to FIG. 2, illustrated therein are more details of one explanatory electronic device 110 configured in accordance with one or more embodiments of the disclosure. While illustrated as a hinged electronic device, the electronic device 110 could include a singular housing that is not deformable and has no hinge, configured in a traditional "candy bar" form factor as well.

Where configured as a candy bar, the display 114 of electronic device 110 would remain exposed and accessible. By contrast, where configured as a hinged device having a first device housing 201 that is selectively pivotable about a hinge 203 relative to the second device housing 202 between a closed position and an axially displaced open position, the display 114 of the electronic device 110 can be selectively concealed and revealed, depending upon whether the electronic device is in the closed position or the axially displaced open position.

The electronic device 110 of FIG. 2 is configured as a portable electronic device, and for illustrative purposes is configured as a smartphone. However, the electronic device 110 could be configured in other ways as well. For example, the electronic device 110 could be configured as a tablet computer, a gaming device, a multimedia player, and so forth. Still other types of electronic devices can be configured in accordance with one or more embodiments of the disclosure as will be readily appreciated by those of ordinary skill in the art having the benefit of this disclosure.

The illustrative electronic device 110 of FIG. 2 includes multiple displays 114,225. A secondary display 225, which can be coupled to either of the first device housing 201 or the second device housing 202, is coupled to the first device housing 201 in this embodiment. This display 225 is considered to be an "exterior" display due to the fact that it is exposed when the first device housing 201 and the second device housing 202 are in the closed position.

The primary display, i.e., display 114, can also be coupled to either or both of the first device housing 201 or the second device housing 202. In this illustrative embodiment, the display 114 is coupled to both the first device housing 201 and the second device housing 202 and spans the hinge 203. In other embodiments, this display 114 can be replaced by two displays, with one coupled to the first device housing 201 and another coupled to the second device housing 202. In either case, this display 114 is considered to be an "interior" display because it is concealed when the first device housing 201 and the second device housing 202 are in the closed position. Either or both of display 114 and/or display 225 can be touch sensitive.

Features can be incorporated into the first device housing 201 and/or the second device housing 202. Examples of such features include an optional camera 226, which was used as the image capture device in the method (100) of FIG. 1, or an optional speaker port 227. Each is shown disposed on the rear side of the electronic device 110 in FIG. 2, but image capture devices could be placed on the front side instead of, or in addition to, camera 226 as well. Illustrating by example, in this illustrative embodiment at least one image capture device 208 is positioned on the front side of the electronic device 110 as well. In this illustrative embodiment, an optional user interface component 228, which may be a button or touch sensitive surface, can also be disposed along the rear side of the second device housing 202.

Also illustrated in FIG. 2 is one explanatory block diagram schematic 200 of one or more components suitable for inclusion the electronic device 110. In one or more embodiments, the block diagram schematic 200 is configured as a printed circuit board assembly disposed within the first device housing 201 and/or second device housing 202 of electronic device 110. Various components can be electrically coupled together by conductors, or a bus disposed along one or more printed circuit boards. It should be noted that the block diagram schematic 200 includes many components that are optional, but which are included in an effort to demonstrate how varied electronic devices configured in accordance with embodiments of the disclosure can be.

Thus, it is to be understood that the block diagram schematic 200 of FIG. 2 is provided for illustrative purposes only and for illustrating components of one electronic device 110 in accordance with embodiments of the disclosure. The block diagram schematic 200 of FIG. 2 is not intended to be a complete schematic diagram of the various components required for an electronic device 110. Therefore, other electronic devices in accordance with embodiments of the disclosure may include various other components not shown in FIG. 2 or may include a combination of two or more components or a division of a particular component into two or more separate components, and still be within the scope of the present disclosure.

The illustrative block diagram schematic 200 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

The illustrative block diagram schematic 200 includes a user interface, one example of which is the display 114, which may optionally be touch sensitive. In one embodiment, users can deliver user input to the display 114 by delivering touch input from a finger, stylus, or other objects disposed proximately with the display 114.

For electronic device 110, since the display 114 spans the hinge 203, it is configured to be flexible. For instance, in one embodiment this display 114 is configured as an organic light emitting diode (OLED) display fabricated on a flexible plastic substrate. This allows the display 114 to be flexible so as to deform when the first device housing 201 pivots about the hinge 203 relative to the second device housing 202. However, it should be noted that other types of displays would be obvious to those of ordinary skill in the art having the benefit of this disclosure. In other embodiments conventional, rigid displays can be disposed to either side of the hinge 203 rather than using a flexible display.

In one embodiment, the display 114 is configured as an active-matrix organic light emitting diode (AMOLED) display. However, it should be noted that other types of displays, including liquid crystal displays, would be obvious to those of ordinary skill in the art having the benefit of this disclosure.

In one embodiment, the electronic device 110 includes one or more processors 205. In one embodiment, the one or more processors 205 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 200. Each of the application processor and the auxiliary processor(s) can be configured to process and execute executable software code to perform the various functions of the electronic device 110 with which the block diagram schematic 200 operates. A storage device, such as memory 206, can optionally store the executable software code used by the one or more processors 205 during operation.

In this illustrative embodiment, the block diagram schematic 200 also includes a communication device 207 that can be configured for wired or wireless communication with one or more other devices or networks. The networks can include a wide area network, a local area network, and/or personal area network. The communication device 207 may also utilize wireless technology for communication, such as, but are not limited to, peer-to-peer or ad hoc communications such as HomeRF, Bluetooth and IEEE 802.11, and other forms of wireless communication such as infrared technology. The communication device 207 can include wireless communication circuitry, one of a receiver, a transmitter, or transceiver, and one or more antennas.

In one embodiment, the one or more processors 205 can be responsible for performing the primary functions of the electronic device with which the block diagram schematic 200 is operational. For example, in one embodiment the one or more processors 205 comprise one or more circuits operable with the user interface to present presentation information to a user. This information can include images and/or video captured by one or more image capture devices 208 of the electronic device 110 having a corresponding image sensor 222.

Additionally, the one or more processors 205 can be operable with an audio output device 209 to deliver audio output to a user. The executable software code used by the one or more processors 205 can be configured as one or more modules that are operable with the one or more processors 205. Such modules can store instructions, control algorithms, and so forth.

In one or more embodiments, the block diagram schematic 200 includes an audio input/processor 211. The audio input/processor 211 can include hardware, executable code, and speech monitor executable code in one embodiment. The audio input/processor 211 can include, stored in memory 206, basic speech models, trained speech models, or other modules that are used by the audio input/processor 211 to receive and identify voice commands that are received with audio input captured by an audio input device. In one embodiment, the audio input/processor 211 can include a voice recognition engine. Regardless of the specific implementation utilized in the various embodiments, the audio input/processor 211 can access various speech models to identify speech commands in one or more embodiments.

The audio input/processor 211 is operable as an audio capture device to receive and capture audio input from a source, such as a person, authorized user, plurality of persons within an environment 212 about the electronic device 110. The audio input/processor 211 can include hardware, executable code, and speech monitor executable code in one embodiment. The audio input/processor 211 can be operable with one or more predefined authentication references stored in memory 206. In one or more embodiments, the audio input/processor 211 can receive and identify voice commands that are received with audio input captured by an audio input device. In one embodiment, the audio input/processor 211 can include a voice recognition engine. Regardless of the specific implementation utilized in the various embodiments, the audio input/processor 211 can access various speech models stored with the predefined authentication references to identify speech commands.

In one embodiment, the audio input/processor 211 is configured to implement a voice control feature that allows the electronic device 110 to function as a voice assistant device, which may be configured as a voice assistant engine. In one or more embodiments, the voice assistant engine is a digital assistant using voice recognition, speech synthesis, and natural language processing to receive audio input comprising a voice command from a source, determine the appropriate response to the voice command, and then deliver the response in the form of audio output in response to receiving the audio input from the source. When so configured, a user can cause the emanation of the audio input from their mouth to cause the one or more processors 205 of the electronic device 110 to execute a control operation.

Various sensors 213 can be operable with the one or more processors 205. A first example of a sensor that can be included with the various sensors 213 is a touch sensor. The electronic device 110 can include one or more touch sensors, each of which can include a capacitive touch sensor, an infrared touch sensor, resistive touch sensors, or another touch-sensitive technology.

Another example of a sensor 213 is a geo-locator that serves as a location detector 214. In one embodiment, location detector determines location data of the electronic device 110. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, such as a CDMA network or GSM network, or from other local area networks, such as Wi-Fi networks.

Another example of a sensor 213 suitable for inclusion with the electronic device 110 include one or more motion sensors that are operable to determine an orientation and/or movement of the electronic device 110 in three-dimensional space. Illustrating by example, the one or more motion sensors can include an accelerometer, gyroscopes, or other device to detect device orientation and/or motion of the electronic device 110.

Another example of a sensor 213 is a force sensor. Where included, the force sensor can take various forms. For example, in one embodiment, the force sensor comprises resistive switches or a force switch array configured to detect contact with either the display or the housing of an electronic device. In another embodiment, the force sensor can be capacitive. In yet another embodiment, piezoelectric sensors can be configured to sense force as well.

An image processing system 216 can be included in the electronic device 110 and can be operable with the one or more processors 205. The image processing system 216 can be operable with one or more image capture devices 208 and can process data from the image sensor data of the one or more image capture device 208. The image processing system 216 can be operable with a dynamic and automatic exposure value selection engine 210, a fusion engine 224, a previous image buffer 204 operable to buffer a previous image 229, and a camera response function 120 that can be stored in the memory 206.

In one or more embodiments, the one or more processors 205 can define one or more process engines. Examples of these process engines include the dynamic and automatic exposure value selection engine 210 and the fusion engine 224. Each process engine can be a component of the one or more processors 205, operable with the one or more processors 205, defined by the one or more processors 205, and/or integrated into the one or more processors 205. Other configurations for these process engines, including as software or firmware modules operable on the one or more processors 205, will be obvious to those of ordinary skill in the art having the benefit of this disclosure.

Illustrating by example, in one or more embodiments the dynamic and automatic exposure value selection engine 210 is operable to dynamically and automatically select, in response to initiation of in image capture operation, exposure values 121 to be used in a bracketing operation generating an HDR image 119. As will be described below, in one or more embodiments the dynamic and automatic exposure value selection engine 210 determines the exposure values 121 by subtracting two base two logarithmic luma values of the camera response function 120.

The one or more processors 205 can then cause the image sensor 222 of the image capture device to capture a sequence of images 117 using the exposure values 121 selected. In one or more embodiments, the sequence of images 117 comprises a first image having a normal exposure value set to zero. In one or more embodiments, the sequence of images 117 comprises a second image having a negative exposure value, but only when a sample image, such as a preview image or other image captured by the image sensor 222 of the image capture device 208, have one or more pixels reading a luma value greater than a saturation limit luma value 504. In one or more embodiments, the sequence of images 117 comprises a third image having a positive exposure value, but only when the sample image has one or more other pixels reading a luma value less than the black level limit luma value (503), as previously described. This keeps the image processing operation fast in that the bracketing operation is only performed when needed and only with the necessary quantity of images.

The fusion engine 224 can then fuse the sequence of images 117 to create the HDR image 119 as previously described. Once the HDR image 119 is generated, it can be rendered at a user interface, one example of which is the display 114.

Other process engines can be included in the electronic device 110 as well. For instance, a context engine 223 can be operable with the various sensors to detect, infer, capture, and otherwise detect external conditions occurring within the environment 212 of the electronic device 110. Where included, one embodiment of the context engine 223 determines assessed contexts and frameworks using adjustable algorithms of context assessment employing information, data, and events. These assessments may be learned through repetitive data analysis. Alternatively, a user may employ the user interface to enter various parameters, constructs, rules, and/or paradigms that instruct or otherwise guide the context engine 223. The context engine 223 can comprise an artificial neural network or other similar technology in one or more embodiments. The various process engines can optionally operate in conjunction with the artificial intelligence engine 240 as well.

In one or more embodiments, each process engine is operable with the one or more processors 205. In some embodiments, the one or more processors 205 can control the various process engines. In other embodiments, each process engine can operate independently, delivering information to the one or more processors 205. The process engines can each receive data from the various sensors 213. In one or more embodiments, the one or more processors 205 are configured to perform the operations of the process engines.

When executing operations such as those method steps described above with reference to FIG. 1, in one or more embodiments the dynamic and automatic exposure value selection engine 210 dynamically and automatically selects exposure values 121 for a sequence of images 117 to be used in a bracketing operation generating an HDR image 119 by subtracting one or more base two logarithmic luma values of the camera response function 120 when pixels of a sample image have either luma values above a saturation luma value of the camera response function 120 or other luma values below a black level limit luma value from the camera response function 120. The one or more processors can then cause the image sensor 222 of the image capture device 208 to capture the sequence of images 117 using the exposure values dynamically and automatically selected by the dynamic and automatic exposure value selection engine 210.

The fusion engine 224 can then fuse the sequence of images 117 to generate the HDR image 119. Other operations can be performed in the image processing pipeline, examples of which include filtering to reduce image noise in the sample image prior to the dynamic and automatic exposure value selection engine 210 dynamically and automatically selecting the exposure values 121.

In one embodiment, the one or more image capture devices 208 comprise a two-dimensional image capture device, such as that illustrated by camera 226. In one or more embodiments, the camera 226 comprises a two-dimensional Red-Green-Blue (RGB) image capture device. The one or more image capture devices 208 can also include an infrared image capture device. Other types of image capture devices suitable for inclusion with the one or more image capture devices 208 will be obvious to those of ordinary skill in the art having the benefit of this disclosure.

Other components 218 operable with the one or more processors 205 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers, the ultrasound transducers (where included), or other alarms and/or buzzers. The other components 218 can also include a mechanical output component such as vibrating or motion-based mechanisms.

The other components 218 can optionally include a barometer operable to sense changes in air pressure due to elevation changes or differing pressures of the electronic device 110. The other components 218 can also optionally include a light sensor 220 that detects changes in optical intensity, color, light, or shadow. In one or more embodiments, the light sensor 220 is operable to determine whether the environment 212 of the electronic device 110 is a low-light environment, one example of which occurs when the light density within the environment 212 is less than one hundred lux.

It is to be understood that FIG. 2 is provided for illustrative purposes only and for illustrating components of one electronic device 110 in accordance with embodiments of the disclosure and is not intended to be a complete schematic diagram of the various components required for an electronic device. Therefore, other electronic devices in accordance with embodiments of the disclosure may include various other components not shown in FIG. 2 or may include a combination of two or more components or a division of a particular component into two or more separate components, and still be within the scope of the present disclosure.

Figure 3:
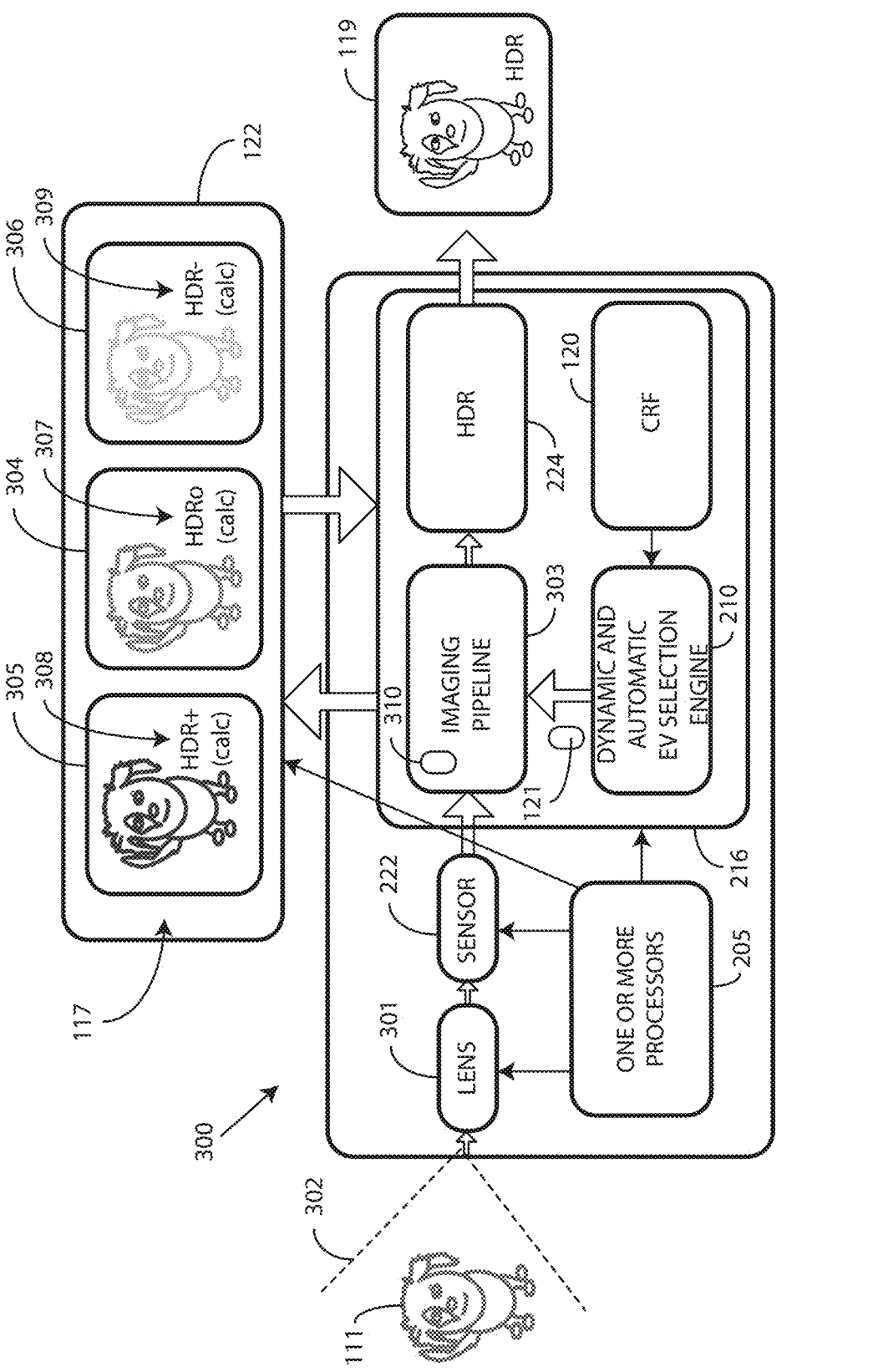
FIG. 3 illustrates one explanatory image processing system suitable for use in an electronic device in accordance with one or more embodiments of the disclosure.

Turning now to FIG. 3, illustrated therein is a system diagram of a system 300 suitable for inclusion in an electronic device, one example of which is the electronic device (110) of FIGS. 1 and 2. The system 300 of FIG. 3 includes the components used for image capture operations. Of course, any of the circuit components described above with reference to the block diagram schematic (200) of FIG. 2 could be included as well.

In one or more embodiments, the system 300 includes a lens 301 that receives light 302 when the system 300 is performing an image capture operation, such as when capturing preview images, static images, or video images of a subject 111. When the light 302 passes through the lens 301, which could be one or more lenses, it passes through to an image sensor 222. The image sensor 222 receives the light 302 and uses a pixel array to convert the light 302 to digital signals that are delivered to an image processing system 216 that is operable with one or more processors 205.

An imaging pipeline 303 of the image processing system 216 performs workflow operations on the digital signals to ultimately generate an HDR image 119. In one or more embodiments, some of these operations are performed using a camera response function 120.

In one or more embodiments, a dynamic and automatic exposure value selection engine 210 dynamically and automatically selects exposure values 121 to be used in a bracketing operation 122 generating the HDR image 119 in response to initiation of image capture operation. In one or more embodiments, the dynamic and automatic exposure value selection engine 210 selects these exposure values by subtracting one or more base two logarithmic luma values of the camera response function 120 when pixels of a sample image 310, which can be as simple as preview image streamed to the image processing system 216 from the image sensor 222 as described above with reference to FIG. 1, or alternatively can actually be a captured image or other type of image, have either luma values above a saturation limit luma value (504) of the camera response function 120 or other luma values below a black level limit luma value (503) of the camera response function 120.

Once these exposure values 121 are selected, one or more processors 205 can cause the image sensor 222 to capture a sequence of images 117. In this illustration, the sequence of images 117 comprises a first image 304 having a normal exposure value 307. In one or more embodiments, the normal exposure value 307 is set to zero.

In this illustrative embodiment, the sequence of images 117 also includes a second image 305 having a positive exposure value and a third image 306 having a negative exposure value 309. This is true because in this illustration the sample image 310 has both luma values above the saturation limit luma value (504) of the camera response function 120 and other luma values below a black level limit luma value (503) of the camera response function 120. However, in other embodiments this will not be the case, as described above.

Figure 4:
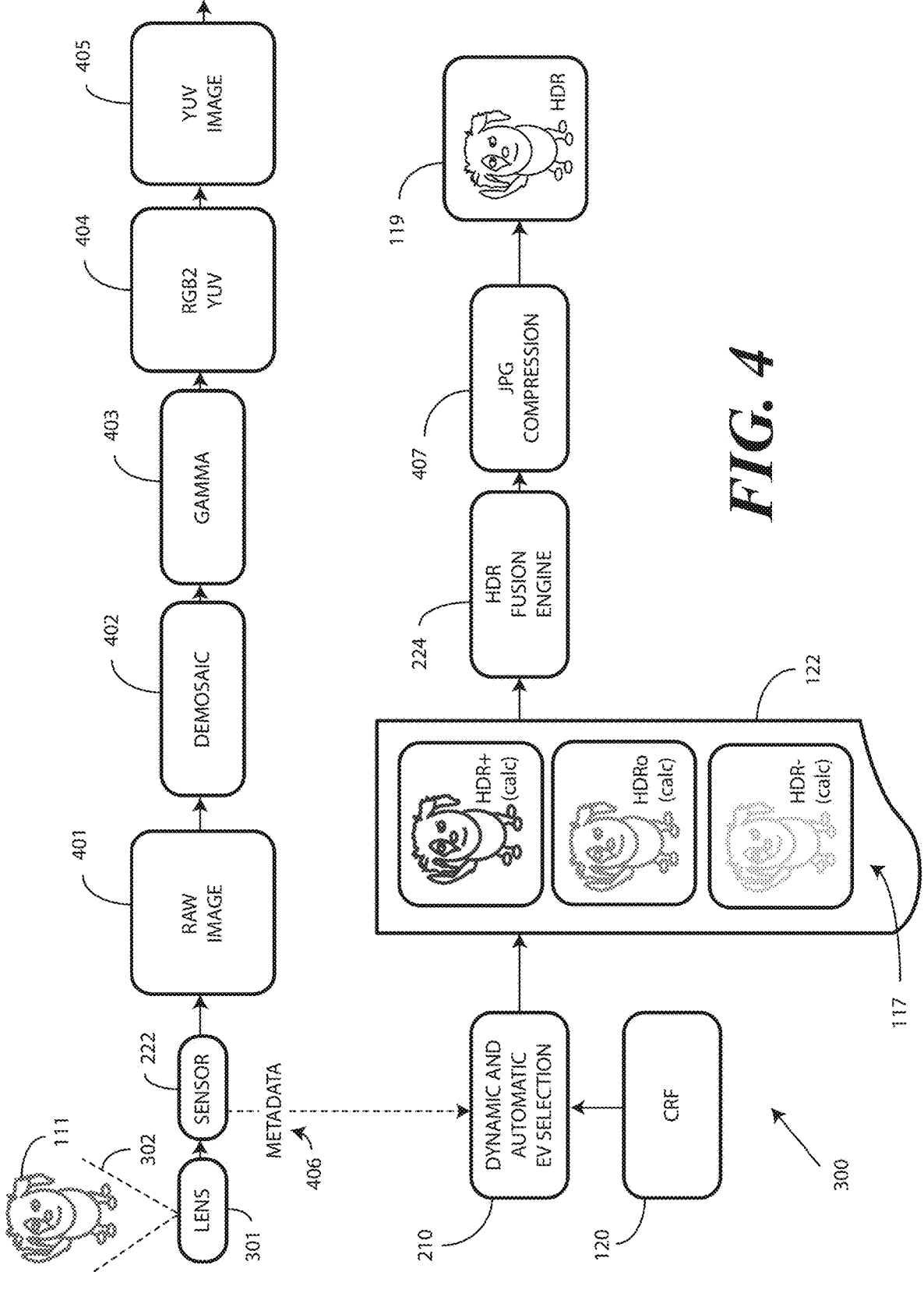
FIG. 4 illustrates one explanatory image processing signal flow in accordance with one or more embodiments of the disclosure.

Once the bracketing operation 112 has been performed, a fusion engine 224 can fuse the sequence of images 117 to obtain the HDR image 119. It should be noted that the image processing system 216 can perform other operations as well. Turning now to FIG. 4, illustrated therein are some such operations. Others will be obvious to those of ordinary skill in the art having the benefit of this disclosure.

Once again, the system 300 includes a lens 301 that receives light 302 when the system 300 is performing an image capture operation, such as when capturing preview images, static images, or video images of a subject 111. Light 302 passes through the lens 301 to the image sensor 222, which uses a pixel array to convert the light 302 to digital signals that define a raw image 401.

In this illustrative embodiment, metadata 406 from the image sensor is delivered in parallel to the dynamic and automatic exposure value selection engine 210. From this metadata 406, the dynamic and automatic exposure value selection engine 210 can determine whether both an ISO and exposure time have changed between the current preview image of the subject 111 and a most recent previously captured image. Where they have not, previous exposure values can be used for the bracketing operation 122.

This optional decision step (1201), which can be omitted, thereby allowing new exposure values to be calculated each time an image capture operation occurs, is shown in FIG. 12. Inclusion of this decision step (1201) speeds up the image processing in that new exposure values are calculated only when the scene seen by the lens 301 changes by a sufficient amount to necessitate the new selection of exposure values.

As previously described, a dynamic and automatic exposure value selection engine 210 dynamically and automatically selects exposure values 121 to be used in a bracketing operation 122 generating the HDR image 119 in response to initiation of image capture operation. In one or more embodiments, the dynamic and automatic exposure value selection engine 210 selects these exposure values by subtracting one or more base two logarithmic luma values of the camera response function 120 when pixels of a sample image 310, which can be as simple as preview image streamed to the image processing system 216 from the image sensor 222 as described above with reference to FIG. 1, or alternatively can actually be a captured image or other type of image, have either luma values above a saturation limit luma value (504) of the camera response function 120 or other luma values below a black level limit luma value (503) of the camera response function 120. To illustrate how this occurs, turn now to FIGS. 7-11.

Figure 7:
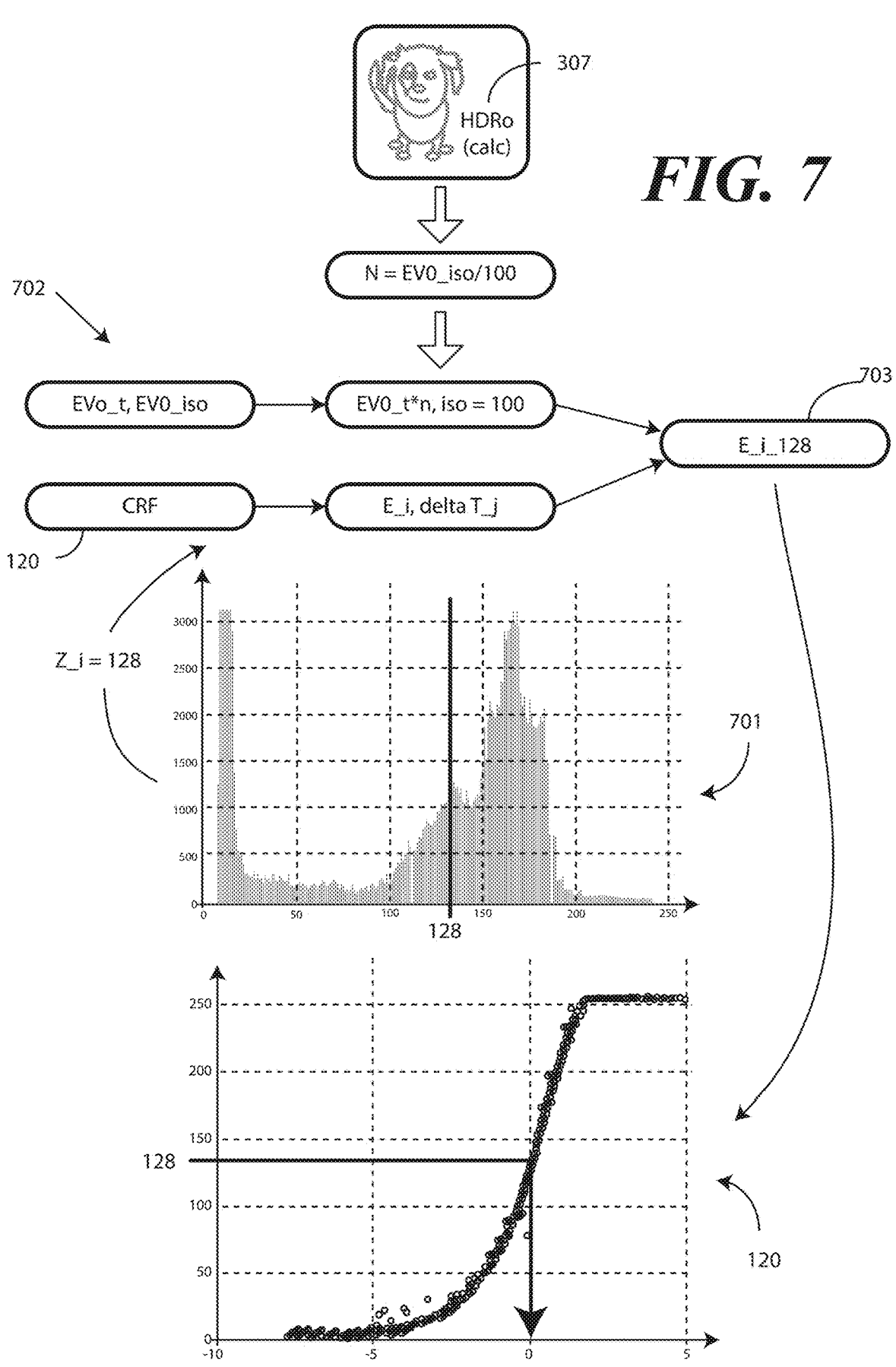
FIG. 7 illustrates one or more method steps for calculating a first exposure value suitable for use in an automatic.

Beginning with FIG. 7, a histogram 701 of the scene seen by the lens (301) of FIG. 4 is shown. A Z value per pixel of 128 is selected and fed into an equation engine 702 that considers the camera response function 120 and selects exposures per pixel and differences in time per exposure. This information considered in conjunction with exposure values set at an ISO of 100, which leads to the selection of an exposure per pixel value for the 128 Z value. As shown in the plot of the camera response function 120 below, this 128 Z value for this histogram 701 sets the normal exposure value 307 to zero.

By contrast, in FIG. 8, a Z value per pixel set at the saturation limit luma value of the camera response function 120, which is 250 in this eight-bit system, is selected and fed into the equation engine 702. Again, the equation engine considers the camera response function 120 and selects exposures per pixel and differences in time per exposure. This information considered in conjunction with exposure values set at an ISO of 100, which leads to the selection of an exposure per pixel value for the 250 Z value. As shown in the plot of the camera response function 120 below, this 250 Z value for this histogram 701 sets the resulting exposure value 803 to a positive value. The negative exposure value 309 can then be calculated according to the method (900) of FIG. 9.

Turning now to FIG. 9, the method 900 illustrated therein begins at step 901 where the pixel values from the histogram (701) are considered relative to thresholds. Decision 902 determines whether any pixel values exceed the saturation limit luma value, which for the illustrative eight-bit example being used for explanatory purposes is 250. Where none are, step 903 concludes that no image having a negative exposure value 309 is needed.

Where there are pixel values above the saturation limit luma value, step 904 allows the EV0 pixel value of 250 go to 128, which is the target exposure. Step 905 then calculates the negative exposure value 309, shown at step 906, using the equation that subtracts the base two logarithm of the normal exposure value 703 obtained in FIG. 7 from the base two logarithm of the resulting exposure value 803 obtained in FIG. 8. As shown, this simple subtraction results in a quick and easy determination of the negative exposure value 309 in real time, when needed, and without the need for static LUT files.

In one or more embodiments, the negative exposure value 309 is calculated according to an equation equal to:

$$\log 2(E\_i\_\text{SatVal}) - \log 2(E\_i\_\text{MidVal}) \qquad (\text{EQ. 2})$$

where E_i_SatVal represents a saturation luma value of the camera response function of the image sensor and E_i_MidVal represents a luma value where a logarithm of an exposure time used to generate the luma value is zero from the camera response function of the image sensor.

The positive exposure value (308) can be determined in a similarly simple manner. Turning now to FIG. 10, a Z value per pixel set at the black level limit luma value of the camera response function 120, which is 100 in this eight-bit system, is selected and fed into the equation engine 702. Again, the equation engine considers the camera response function 120 and selects exposures per pixel and differences in time per exposure. This information considered in conjunction with exposure values set at an ISO of 100, which leads to the selection of an exposure per pixel value for the 10 Z value. As shown in the plot of the camera response function 120 below, this 10 Z value for this histogram 701 sets the resulting exposure value 1003 to a negative value. The positive exposure value 308 can then be calculated according to the method (1100) of FIG. 11.

Turning now to FIG. 11, the method 1100 illustrated therein begins at step 1101 where the pixel values from the histogram (701) are considered relative to thresholds. Decision 1102 determines whether any pixel values fall below the black level limit luma value, which for the illustrative eight-bit example being used for explanatory purposes is 10. Where none are, step 1103 concludes that no image having a positive exposure value 308 is needed.

Where there are pixel values below the black level limit luma value, step 1104 allows the 10 pixel value of 10 go to 128, which is the target exposure. Step 1105 then calculates the positive exposure value 308, shown at step 1106, using the equation that subtracts the resulting exposure value 1003 obtained in FIG. 10 from the base two logarithm of the normal exposure value 703 obtained in FIG. 7. Once again, this simple subtraction results in a quick and easy determination of the positive exposure value 308 in real time, when needed, and without the need for static LUT files.

In one or more embodiments, the positive exposure value 308 is calculated according to another equation equal to:

$$\log 2(E\_i\_\text{MidVal}) - \log 2(E\_i\_\text{BlkLL}) \qquad (\text{EQ.3})$$

where E_i_BlkLL represents the black level limit luma value from the camera response function of the image sensor.

Turning now back to FIG. 3, the digital values from the image sensor 222 define a raw image 401. This raw image 401 can be passed through filters to reduce noise. A demosaic algorithm 402 can be used to reconstruct missing color channels using interpolation from adjacent pixels. Similarly, image gamma 403 can redistribute tonal levels to create more visually looking uniform tones to give the raw image 401 depth. A converter 404 can convert the raw image 401 into a YUV image 405, and so forth.

Using the techniques illustrated in FIGS. 7-11, the dynamic and automatic exposure value selection engine 210 can select any necessary exposure values. Once these exposure values (121) are selected, one or more processors (205) can cause the image sensor 222 to capture a sequence of images 117 for a bracketing operation 122. Once the bracketing operation 112 has been performed, a fusion engine 224 can fuse the sequence of images 117 to obtain the HDR image 119. JPG compression 407 can optionally be applied to reduce the size of the HDR image 119 as well.

A summary of the previously described methods is shown in FIG. 13. Turning now to FIG. 13, in one or more embodiments the method 1300 detects, at step 1301, user input received at a user interface of an electronic device initiating an image capture operation. Step 1302 then obtains a histogram of a scene seen by an image sensor. Step 1303 then dynamically and automatically selects exposure values for a bracketing operation generating an HDR image using a camera response function and the histogram obtained at step 1302 as described above with reference to FIGS. 7-11.

At step 1304, the image sensor captures a sequence of images using the exposure values selected at step 1303. At step 1304, a fusion engine fuses the sequence of images to generate the HDR image.

In one or more embodiments, step 1303 is performed for every image capture operation that is initiated. This ensures that the proper exposure values for the bracketing operation are continually chosen as a function of the current scene seen by the image sensor. However, in other embodiments step 1303 is performed only when the scene changes by at least a predefined threshold.

Illustrating by example, turning now to FIG. 14, in this alternate method 1400 step 1301 can again detect user input initiating an image capture operation while step 1302 obtains the histogram from metadata received from the image sensor. Decision 1401 can then determine whether ISO and exposure time defined by the histogram have changed beyond a predetermined threshold from the last time the exposure values were dynamically calculated. Example thresholds include the ISO changing by more than one stop and the exposure time changes by more than $\frac{1}{100}^{th}$ of a second. Others will be obvious to those of ordinary skill in the art having the benefit of this disclosure.

Where there has been no such change, step 1402 can simply use the previously calculated exposure values for the bracketing operation. However, when there has been such a change, steps 1303,1304,1305 can again be performed as previously described.

To illustrate just how dramatically embodiments of the disclosure can affect the resulting HDR image that is generated, consider some examples. Turn now to FIG. 15, where an image 1501 of a lobby was taken using static exposure values selected from a LUT file that do not change when the scene does. In this example, the three images used in a bracketing operation had exposure values of zero, zero, and minus four. By contrast, turning now to FIG. 16, another image 1601 of the same lobby was captured using embodiments of the disclosure. The exposure values dynamically selected for the bracketing operation were zero, minus four, and plus three. As can be seen, the detail of the walls, sofa, chair, and rug are dramatically enhanced. What's more, there was no need for a LUT file!

Similar results can be seen by comparing FIGS. 17 and 18, which take zoomed in photos 1701,1801 of the pillow on the sofa of the lobby, respectively. Again, the photo 1701 of FIG. 17 used a LUT file for its bracketing operation. The three images used in a bracketing operation had exposure values of zero, zero, and minus four. By contrast, the photo 1801 of FIG. 18 dynamically selected for the bracketing operation were zero, minus four, and plus three. As can be seen, the detail of the sofa covering and pillow are again dramatically enhanced. Again, no LUT file was required.

Turning now to FIG. 19, illustrated therein are various embodiments of the disclosure. The embodiments of FIG. 19 are shown as labeled boxes in FIG. 19 due to the fact that the individual components of these embodiments have been illustrated in detail in FIGS. 1-19, which precede FIG. 19. Accordingly, since these items have previously been illustrated and described, their repeated illustration is no longer essential for a proper understanding of these embodiments. Thus, the embodiments are shown as labeled boxes.

At 1901, a method for high dynamic range imaging comprises dynamically and automatically, using one or more processors, selecting exposure values for a sequence of images to be used in a bracketing operation generating an HDR image. At 1901, the method comprises capturing, by an image sensor operable with the one or more processors, the sequence of images using the exposure values selected. At 1901, the method comprises fusing, by the one or more processors, the sequence of images to generate the HDR image.

At 1902, the method of 1901 further comprises detecting, by the one or more processors from a user interface, user input initiating an image capture operation using the image sensor. At 1902, the dynamically and automatically selecting the exposure values for the sequence of images occurs in response to the user input initiating the image capture operation. At 1903, the sequence of images of 1902 each comprise a YUV image.

At 1904, a normal exposure value of 1901 is set to EV0, which corresponds to an exposure time of one second and an aperture of f/1.0. At 1904, the sequence of images comprises a first image having the normal exposure value, a second image having a positive exposure value, and a third image having a negative exposure value.

At 1905, selection of the exposure values for the sequence of images at 1901 is made using a camera response function of the image sensor. At 1906, a normal exposure value of 1905 is set to EV0. At 1906, the sequence of images comprises a first image having the normal exposure value and at least one other image having another exposure value different from the normal exposure value. At 1907, the at least one other image of 1906 having the other exposure value different from the normal exposure value comprises a second image having a negative exposure value only when a preview image has one or more pixels with a luma value greater than a saturation luma value.

At 1908, the negative exposure value of 1907 is calculated according to an equation equal to:

$$\log 2(E\_i\_SatVal) - \log 2(E\_i\_MidVal) \qquad \text{(EQ. 2)}$$

where E_i_SatVal represents the saturation luma value of the camera response function of the image sensor and E_i_MidVal represents a luma value half-way between zero and E_i_SatVal from the camera response function of the image sensor.

At 1909, the at least one image of 1908 having another exposure value different from the normal exposure value comprises a third image having a positive exposure value only when the preview image has one or more other pixels with a luma value less than a black level limit luma value. At 1910, the positive exposure value of 1909 is calculated according to another equation equal to:

$$\log 2(E\_i\_MidVal) - \log 2(E\_i\_BlkLL) \qquad \text{(EQ. 4)}$$

where E_i_BlkLL represents the black level limit luma value from the camera response function of the image sensor.

At 1911, the method of 1901 further comprises buffering, by the one or more processors in a memory, a previous exposure time and previous ISO, of a previous preview image. At 1911, the method comprises determining, by the one or more processors, whether another ISO and another exposure time associated with another preview image have changed from the previous exposure time and previous ISO by at least a threshold.

At 1911, when the new ISO and new exposure time have changed from the previous ISO and previous exposure time by at least the threshold, the method comprises dynamically and automatically, using the one or more processors, selecting new exposure values for another sequence of images to be used in another bracketing operation generating another HDR image. At 1911, when the ISO and exposure time have changed, the method comprises capturing, by the image sensor, another sequence of images using the new exposure values selected and fusing, by the one or more processors, another sequence of images to generate another HDR image.

At 1911, when the ISO and exposure time have failed to change, the method comprises capturing, by the image sensor, another sequence of images using the exposure values selected and fusing, by the one or more processors, another sequence of images to generate the another HDR image.

At 1912, an electronic device comprises an image sensor and one or more processors operable with the image sensor. At 1912, the one or more processors are operable to dynamically and automatically select, in response to initiation of an image capture operation, exposure values using a camera response function for the image sensor for a sequence of images to be used in a bracketing operation generating an HDR image, cause the image sensor to capture the sequence of images using the exposure values selected, and fuse the sequence of images to create the HDR image.

At 1913, the electronic device of 1912 further comprises a user interface. At 1913, the one or more processors are further configured to render the HDR image at the user interface. At 1914, the exposure values of 1912 are determined by subtracting base two logarithmic luma values of the camera response function.

At 1915, a normal exposure value of 1914 is set to zero. At 1915, the sequence of images comprises a first image having the normal exposure value, a second image having a negative exposure value only when a sample image has one or more pixels with a luma value greater than a saturation value of a camera response function of the image capture device, and a third image having a positive exposure value only when the sample image has one or more other pixels with a luma value less than black level limit luma value of the camera response function of the image capture device.

At 1916, the one or more processors of 1912 are only configured to dynamically and automatically select the exposure values when both an ISO and an exposure time have changed between a preview image captured by the image sensor and a previous sample image by at least a predefined threshold.

At 1917, a method for adaptive HDR imaging comprises dynamically and automatically, using one or more processors, selecting exposure values for a sequence of images to be used in a bracketing operation generating an HDR image in response to initiation of an image capture operation by subtracting one or more base two logarithmic luma values of a camera response function when pixels of the sample image have either luma values above a saturation luma value of the camera response function or other luma values below a black level limit luma value from the camera response function. At 1917, the method comprises causing, by the one or more processors, the image sensor to capture the sequence of images using the exposure values dynamically selected.

At 1918, the method of 1917 further comprises fusing, by the one or more processors, the sequence of images to generate the HDR image. At 1919, the method of 1918 further comprises capturing another sequence of images using other exposure values that are both dynamically selected and different from the exposure values. At 1919, the method comprises fusing the other sequence of images to generate another HDR image. At 1920, the sequence of images of 1918 are used to generate the HDR image are one of RAW images, staggered HDR images, dual conversion gain (DCG) pixel generated images, or cell spatial fusion images.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method for high dynamic range (HDR) imaging, the method comprising:

dynamically and automatically, using one or more processors, selecting exposure values for a sequence of images to be used in a bracketing operation generating an HDR image;

capturing, by an image sensor operable with the one or more processors, the sequence of images using the exposure values selected; and fusing, by the one or more processors, the sequence of images to generate the HDR image;

wherein:

the sequence of images comprises:

a first image having a normal exposure value; and at least one other image having another exposure value different from the normal exposure value and comprising a second image having a negative exposure value only when a preview image has one or more pixels with a luma value greater than a saturation luma value.

2. The method of claim 1, further comprising:

detecting, by the one or more processors from a user interface, user input initiating an image capture operation using the image sensor;

wherein the dynamically and automatically selecting the exposure values for the sequence of images occurs in response to the user input initiating the image capture operation.

3. The method of claim 2, wherein the sequence of images each comprise a YUV image.

4. The method of claim 1, wherein:

a normal exposure value is set to EV0; and the sequence of images comprises:

a first image having the normal exposure value;

a second image having a positive exposure value; and a third image having a negative exposure value.

5. The method of claim 1, wherein selection of the exposure values for the sequence of images is made using a camera response function of the image sensor.

6. The method of claim 1, wherein the normal exposure value is set to EV0.

7. The method of claim 1, wherein the at least one other image having the another exposure value different from the normal exposure value comprises a second image having a positive exposure value when the preview image has the one or more pixels with the luma value less than a black level limit luma value.

8. The method of claim 5, wherein the negative exposure value is calculated according to an equation equal to:

$$\log 2(E\_i\_\text{SatVal}) - \log 2(E\_i\_\text{MidVal}), \text{where:}$$

E_i_SatVal represents the saturation luma value of the camera response function of the image sensor; and E_i_MidVal represents a luma value half-way between zero and E_i_SatVal from the camera response function of the image sensor.

9. The method of claim 8, wherein the at least other one image having the another exposure value different from the normal exposure value comprises a third image having a positive exposure value only when the preview image has one or more other pixels with a luma value less than a black level limit luma value.

10. The method of claim 9, wherein the positive exposure value is calculated according to another equation equal to:

$$\log 2(E\_i\_\text{MidVal}) - \log 2(E\_i\_\text{BlkLL}), \text{where:}$$

E_i_BlkLL represents the black level limit luma value from the camera response function of the image sensor.

11. The method of claim 1, further comprising:

buffering, by the one or more processors in a memory, a previous exposure time and previous ISO;

capturing, by the image sensor, another preview image; and determining, by the one or more processors, whether another ISO and another exposure time associated with the another preview image have changed from the previous exposure time and previous ISO by at least a threshold;

wherein:

when the another ISO and another exposure time have changed from the previous exposure time and previous ISO by at least the threshold:

dynamically and automatically, using the one or more processors, selecting new exposure values for another sequence of images to be used in another bracketing operation generating another HDR image;

capturing, by the image sensor, the another sequence of images using the new exposure values selected; and fusing, by the one or more processors, the another sequence of images to generate the another HDR image; and when the ISO and exposure time have failed to change:

capturing, by the image sensor, the another sequence of images using the exposure values selected; and fusing, by the one or more processors, the another sequence of images to generate the another HDR image.

12. An electronic device, comprising:

an image sensor; and one or more processors operable with the image sensor; wherein:

the one or more processors are operable to dynamically and automatically select, in response to initiation of an image capture operation, exposure values using a camera response function for the image sensor for a sequence of images to be used in a bracketing operation generating an HDR image, cause the image sensor to capture the sequence of images using the exposure values selected, and fuse the sequence of images to create the HDR image; and the sequence of images comprises:

a first image having a normal exposure value;

a second image having a negative exposure value only when a sample image has one or more pixels with a luma value greater than a saturation value of a camera response function of the image sensor; and a third image having a positive exposure value only when the sample image has one or more other pixels with a luma value less than black level limit luma value of the camera response function of the image sensor.

13. The electronic device of claim 12, further comprising a user interface, wherein the one or more processors are further configured to render the HDR image at the user interface.

14. The electronic device of claim 12, wherein the exposure values are determined by subtracting base two logarithmic luma values of the camera response function.

15. The electronic device of claim 12, wherein the normal exposure value is set to zero.

16. The electronic device of claim 12, wherein the one or more processors are only configured to dynamically and automatically select the exposure values when both an ISO and an exposure time have changed between a preview image captured by the image sensor and a previous sample image by at least a predefined threshold.

17. A method for adaptive HDR imaging, the method comprising:

dynamically and automatically, using one or more processors, selecting exposure values for a sequence of images to be used in generating an HDR image by subtracting one or more base two logarithmic luma values of a camera response function when pixels of a sample image have either luma values above a saturation luma value of the camera response function or other luma values below a black level limit luma value from the camera response function; and causing, by the one or more processors, an image sensor to capture the sequence of images using the exposure values dynamically selected.

18. The method of claim 17, further comprising fusing, by the one or more processors, the sequence of images to generate the HDR image.

19. The method of claim 18, further comprising:

capturing another sequence of images using other exposure values that are both dynamically selected and different from the exposure values; and fusing the another sequence of images to generate another HDR image.

20. The method of claim 19, wherein the sequence of images used to generate the HDR image are one of RAW images, staggered HDR images, dual conversion gain (DCG) pixel generated images, or cell spatial fusion images.

* * * * *